(12) United States Patent
Sasamoto

(10) Patent No.: US 10,437,039 B2
(45) Date of Patent: Oct. 8, 2019

(54) IMAGE-ACQUISITION APPARATUS

(71) Applicant: OLYMPUS CORPORATION, Tokyo (JP)

(72) Inventor: Tsutomu Sasamoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/139,551

(22) Filed: Apr. 27, 2016

(65) Prior Publication Data

US 2016/0238832 A1     Aug. 18, 2016

Related U.S. Application Data

(63) Continuation of application No. PCT/JP2014/078714, filed on Oct. 29, 2014.

(30) Foreign Application Priority Data

Oct. 30, 2013   (JP) .................................. 2013-225635

(51) Int. Cl.
*G02B 7/02* (2006.01)
*G02B 9/04* (2006.01)
(Continued)

(52) U.S. Cl.
CPC ........... *G02B 23/243* (2013.01); *G02B 7/023* (2013.01); *G02B 7/025* (2013.01); *G02B 9/04* (2013.01);
(Continued)

(58) Field of Classification Search
CPC . G02B 9/60; G02B 9/04; G02B 13/06; G02B 23/243; G02B 7/025; G02B 7/023
(Continued)

(56) References Cited

U.S. PATENT DOCUMENTS 5,873,816 A * 2/1999 Kagawa ............. A61B 1/00114
600/110
5,891,015 A * 4/1999 Strahle .................. A61B 1/042
359/434
(Continued)

FOREIGN PATENT DOCUMENTS

CN    CN 103370646 A    10/2013
EP       2759862          7/2014
(Continued)

OTHER PUBLICATIONS

Datasheet Search Engine Http://www.datasheetlib.com/. datasheetlib. com—Sony IMX078CQK Web. May 15, 2017.*
(Continued)

*Primary Examiner* — Zachary W Wilkes
(74) *Attorney, Agent, or Firm* — Hunton Andrews Kurth LLP

(57) ABSTRACT

An image-acquisition apparatus includes an objective lens consisting of, in order from an object side, a first group and a second group, an image-acquisition device that converts an optical image of an object formed by the objective lens into an electrical signal, a first holding frame holding the first group of the objective lens inside, and a second holding frame holding the second group of the objective lens and the image-acquisition device inside. The objective lens satisfies specific conditions.

5 Claims, 21 Drawing Sheets

(51) Int. Cl.
*G02B 13/06* (2006.01)
*G02B 23/24* (2006.01)
*H04N 5/225* (2006.01)

(52) U.S. Cl.
CPC ......... *G02B 13/06* (2013.01); *G02B 23/2484* (2013.01); *G02B 23/2492* (2013.01); *H04N 5/2254* (2013.01)

(58) Field of Classification Search
USPC .......................................... 359/661, 793, 811
See application file for complete search history.

(56) References Cited

U.S. PATENT DOCUMENTS

| | | | | |
|---|---|---|---|---|
| 8,000,028 | B2* | 8/2011 | Imura | G02B 7/02 359/694 |
| 2006/0061885 | A1* | 3/2006 | Ito | G02B 7/023 359/811 |
| 2009/0253966 | A1* | 10/2009 | Ichimura | A61B 1/0008 600/175 |
| 2013/0057666 | A1 | 3/2013 | Fujii | |
| 2013/0317299 | A1* | 11/2013 | Fujii | G02B 23/2438 600/176 |
| 2014/0092225 | A1 | 4/2014 | Sasamoto | |
| 2014/0153105 | A1* | 6/2014 | Saito | G02B 15/177 359/680 |

FOREIGN PATENT DOCUMENTS

| | | |
|---|---|---|
| JP | 02-090118 | 3/1990 |
| JP | 04-001713 | 1/1992 |
| JP | 05-288985 | 11/1993 |
| JP | 05-288986 | 11/1993 |
| JP | 06-308381 | 11/1994 |
| JP | 08-179226 | 7/1996 |
| JP | 09-192093 | 7/1997 |
| JP | 2000-292692 | 10/2000 |
| JP | 2001-194580 | 7/2001 |
| JP | 2002-131633 | 5/2002 |
| JP | 2002-343949 | 11/2002 |
| JP | 2003-000526 | 1/2003 |
| JP | 2004-021158 | 1/2004 |
| JP | 2005-080713 | 3/2005 |
| JP | 2007-114546 | 5/2007 |
| JP | 2010-032680 | 2/2010 |
| JP | 2013-198566 | 10/2013 |
| WO | WO 2012/108177 | 8/2012 |
| WO | WO 2013/042546 | 3/2013 |

OTHER PUBLICATIONS

International Search Report, dated Feb. 10, 2015, issued in corresponding International Application No. PCT/JP2014/078714.
European Search Report in Application No. EP 14859073.0 dated May 10, 2017.
Ofice Action in corresponding Chinese Patent Application No. 201480059530.1, dated Sep. 5, 2017.

* cited by examiner

IMAGE-ACQUISITION APPARATUS

CROSS-REFERENCE TO RELATED APPLICATIONS

This is a continuation of International Application PCT/JP2014/078714, with an international filing date of Oct. 29, 2014, which is hereby incorporated by reference herein in its entirety. This application claims the benefit of Japanese Patent Application No. 2013-225635, filed on Oct. 30, 2013, the content of which is incorporated herein by reference.

TECHNICAL FIELD

The present invention relates to image-acquisition apparatuses, and particularly to endoscopic image-acquisition apparatuses.

BACKGROUND ART

Recently, medical endoscopes, such as nasal endoscopes, including insertion sections with reduced tip diameters have been desired, for example, for improved patient comfort. Accordingly, compact endoscopic image-acquisition devices (e.g., CCD and CMOS sensors) have been developed, and the pixel pitch thereof has been decreasing year by year. With the decreasing pixel pitch, assembly tolerances, such as those of the distance between lenses and the distance between image-acquisition devices and objective lenses, have been becoming smaller, and assembly errors of several micrometers can be problematic. In particular, the accuracy of positioning the objective lens relative to the image-acquisition device greatly affects the depth of field of the endoscope, and the positioning of the objective lens relative to the image-acquisition device often requires an accuracy of 1 μm or less.

Conventional endoscopic image-acquisition apparatuses employ a structure in which an objective lens unit frame holding an objective lens and an image-acquisition-device holding frame holding an image-acquisition device are fitted together (see, for example, Patent Literature PTL 1). The objective lens in this structure is focused on the image-acquisition device by adjusting the positions of the objective lens unit frame and the image-acquisition-device holding frame relative to each other before the fitted portions of the two frames are bonded together with a thermosetting resin.

The components of the above endoscopic image-acquisition apparatus and the assembly jig used to fix the objective lens unit frame and the image-acquisition-device holding frame expand thermally when the thermosetting resin is cured by heating in a drying oven. This thermal expansion may cause the positions of the objective lens unit frame and the image-acquisition-device holding frame to deviate from their desired positions.

CITATION LIST

Patent Literature

{PTL 1}
Japanese Unexamined Patent Application, Publication No. HEI-9-192093

SUMMARY OF INVENTION

An aspect of the present invention is an image-acquisition apparatus including an objective lens that forms an optical image of an object, an image-acquisition device that converts the optical image formed by the objective lens into an electrical signal, and first and second holding frames holding the objective lens and the image-acquisition device inside. The objective lens consists of, in order from an object side, a first group and a second group. The first holding frame holds the first group. The second holding frame holds the image-acquisition device and the second group. The objective lens satisfies conditions (1) and (2):

$$-2.871 < f\_front/f < -1.180 \quad (1)$$

$$-1.498 < f\_front/f\_rear < -0.607 \quad (2)$$

where f_front is a focal length of the first group, f_rear is a focal length of the second group, and f is a focal length of the entire objective lens.

DESCRIPTION OF EMBODIMENTS

An endoscopic image-acquisition apparatus 1 according to an embodiment of the present invention will be described below with reference to FIG. 1.

Figure 1:
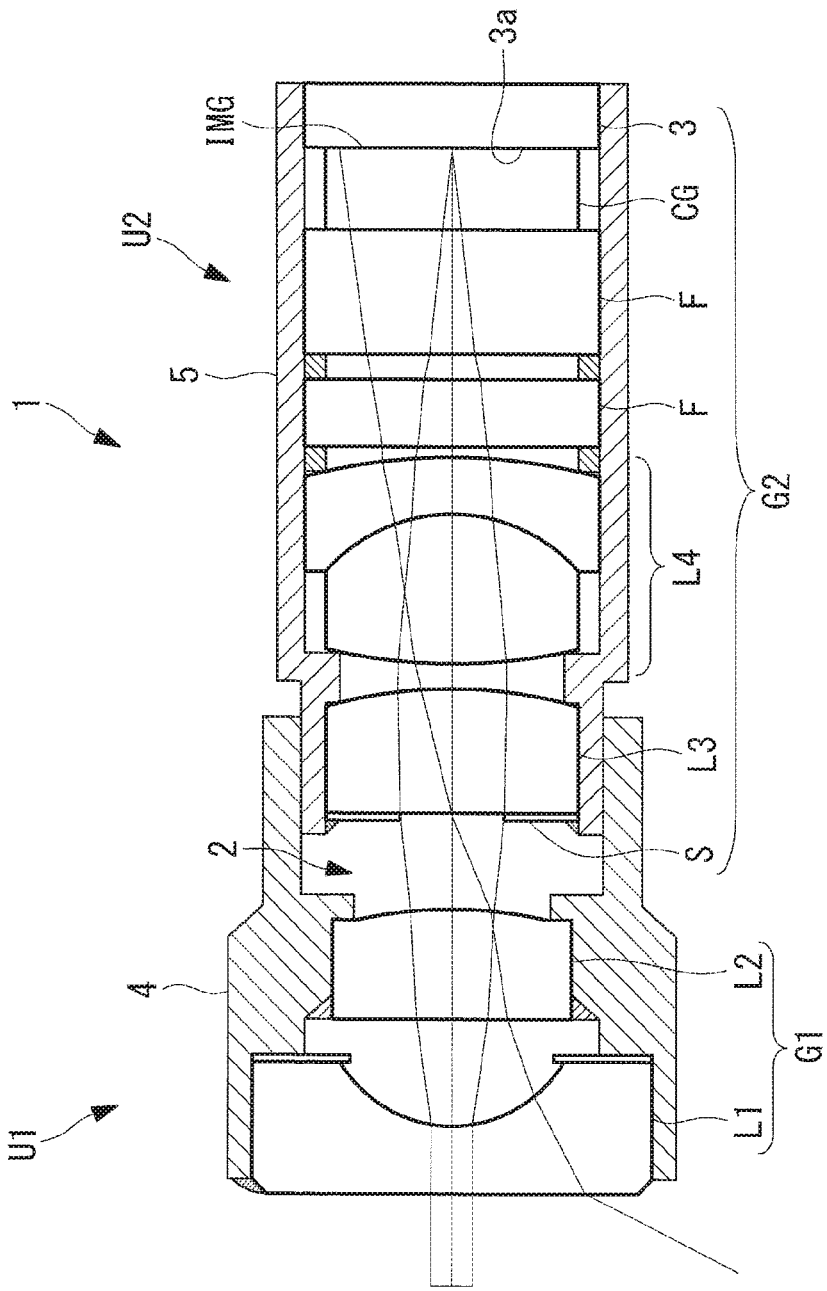
FIG. 1 is a sectional view illustrating the overall configuration of an image-acquisition apparatus according to an embodiment of the present invention.

As shown in FIG. 1, the image-acquisition apparatus 1 according to this embodiment includes an objective lens 2 that forms an optical image of an object, an image-acquisition device 3 that converts the optical image formed by the objective lens 2 into an electrical signal, and two cylindrical holding frames 4 and 5 holding the objective lens 2 and the image-acquisition device 3. As shown, reference sign S denotes an aperture stop, reference sign F denotes an optical filter, reference sign CG denotes a glass cover, and reference sign IMG denotes the image plane of the objective lens 2.

The objective lens 2 is a retrofocus type lens, which is suitable for achieving wider angles and smaller sizes, and consists of, in order from the object side, a first group G1 and a second group G2. The first group G1 in this example includes, in order from the object side, a plano-concave lens L1 having the flat side thereof facing the object side and a plano-convex lens L2 having the flat side thereof facing the object side. The second group G2 includes, in order from the object side, a plano-convex lens L3 having the flat side thereof facing the object side and a cemented lens L4 composed of a biconvex lens and a meniscus lens.

The first group G1 and the second group G2 satisfy conditions (1) and (2):

$$f\_front/f < 0 \quad (1)$$

$$f\_front/f\_rear < 0 \quad (2)$$

where f_front is the focal length (mm) of the first group G1, f_rear is the focal length (mm) of the second group G2, f is the focal length (mm) of the entire objective lens 2, and f>0. That is, the lenses L1 to L4 that form the objective lens 2 are divided into a divergent system, namely, the first group G1, and a convergent system, namely, the second group G2.

Preferably, the first group G1 and the second group G2 satisfy conditions (1)′ and (2)′.

$$-2.871 < f\_front/f < -1.180 \quad (1)'$$

$$-1.498 < f\_front/f\_rear < -0.607 \quad (2)'$$

The objective lens 2 and the image-acquisition device 3 also satisfy condition (3):

$$2.5 \times P \times Fno < 0.03 \quad (3)$$

where P is the pixel pitch (mm) of the image-acquisition device 3, and Fno is the effective f-number of the objective lens 2.

Figure 21:
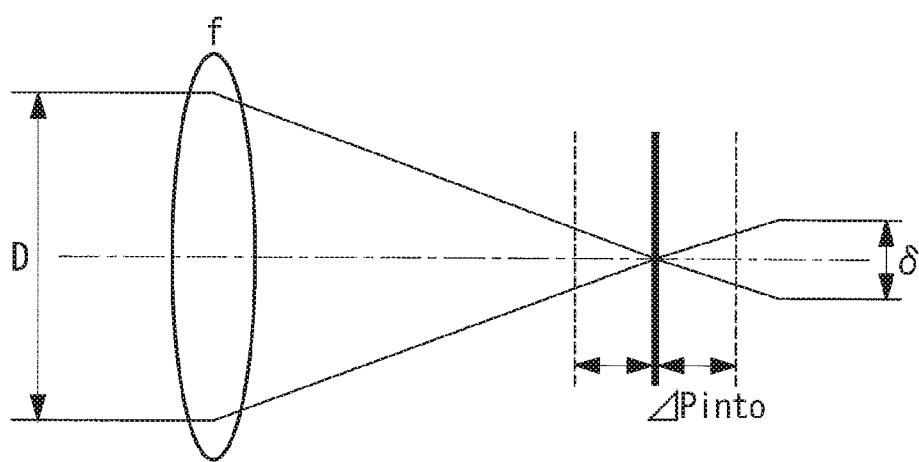
FIG. 21 is a diagram for illustrating condition (3).

Condition (3) will now be described. As shown in FIG. 21, the defocus tolerance, $\Delta_{Pinto}$, of the image-acquisition apparatus 1 is expressed by the following equations:

$$\delta/D = \Delta_{Pinto}/f$$

$$\Delta_{Pinto} = \delta \cdot f/D$$

Substituting δ=2.5P gives the following equation:

$$\Delta_{Pinto} = Fno \times 2.5 \times P$$

where D is the effective aperture of the objective lens 2, f is the focal length of the objective lens 2, and δ is the tolerable blur diameter on an image-acquisition plane 3a.

The reason for using δ=2.5P in this embodiment is as follows. Specifically, if an image of a black-and-white chart is formed on an image-acquisition device by an objective optical system for each pixel of the image-acquisition device, the reference blur level is δ=2P, which is used in image-acquisition devices such as those that use luminance signals. An image-acquisition device including a color filter for each pixel of the image-acquisition device needs to create a luminance signal from the color filter, and the reference blur level is typically δ=3P. Thus, the middle level, i.e., δ=2.5P, is used as a reference blur level that is compatible with all types of image-acquisition devices.

The second group G2 includes at least one cemented lens L4. The cemented lens L4, which is disposed near the image plane IMG, can effectively correct for chromatic aberration of magnification due to the concave lens L1 of the first group G1.

The holding frames 4 and 5 are the first holding frame 4 holding the first group G1 and the second holding frame 5 integrally holding the second group G2 and the image-acquisition device 3. That is, the image-acquisition apparatus 1 is composed of two sections: a first unit U1 composed of the first group G1 and the first holding frame 4 and a second unit U2 composed of the second group G2, including the aperture stop S, the image-acquisition device 3, and the second holding frame 5.

The end of the first holding frame 4 on the image side and the end of the second holding frame 5 on the object side are fitted to each other in a nested manner. This allows the first holding frame 4 and the second holding frame 5 to be moved relative to each other along the optical axis of the objective lens 2 during manufacture.

The operation of the thus-constructed image-acquisition apparatus 1 will now be described.

During the manufacture of the image-acquisition apparatus 1 according to this embodiment, the first unit U1 is positioned relative to the second unit U2 by adjusting the position of the first unit U1 relative to the second unit U2 along the optical axis so that the image plane IMG coincides with the image-acquisition plane 3a of the image-acquisition device 3. In this way, the focusing of the image-acquisition apparatus 1 is achieved.

The surfaces of the ends of the two holding frames 4 and 5 are coated with a thermosetting resin adhesive in advance, and after the two units U1 and U2 are positioned as described above, the portions of the holding frames 4 and 5 fitted to each other are heated to cure the adhesive. In this way, the holding frames 4 and 5 are bonded to each other to couple the two units U1 and U2 together.

Focusing of the conventional endoscopic image-acquisition apparatus is performed by adjusting the distance between the entire objective lens and the image-acquisition device. In this case, the amount of movement of the objective lens is equal to the amount of movement of the image plane; therefore, the objective lens requires a high positional accuracy equal to the accuracy of positioning the image plane relative to the image-acquisition plane. If the position of the image plane deviates from the image-acquisition plane, the desired depth of field required for endoscopes cannot be stably achieved. Specifically, the range from near to far in which objects appear with a certain resolution through an endoscope cannot be stably and uniformly provided.

In contrast, focusing is performed in this embodiment only by the movement of the divergent system located on the object side, namely, the first group G1. In this case, the amount of movement of the image plane IMG is smaller than the amount of movement of the first group G1; therefore, the first group G1 requires a positioning accuracy lower than the accuracy of positioning the image plane IMG relative to the image-acquisition plane 3a. For example, if the accuracy of positioning the image plane IMG relative to the image-acquisition plane 3a is 1 μm, the first group G1 only requires a positioning accuracy of about several to ten micrometers. Thus, the use of the first group G1, which has less effect on the position of the image plane IMG, for focusing allows the deviation of the image plane IMG from the image-acquisition plane 3a to fall within a tolerance limit of 1 μm or less in the event of an error in the positioning of the first group G1 or a deviation of the position of the first group G1 during the curing of the adhesive. The image-acquisition apparatus 1 can thus be easily manufactured with the desired depth of field equal to that of the objective lens 2.

Additionally, the solution employed in this embodiment does not depend on improved assembly accuracy and thus facilitates a reduction in pixel pitch. Specifically, with the conventional technique in which focusing is performed by adjusting the distance between the entire objective lens 2 and the image-acquisition device, it is difficult to achieve a high focusing accuracy sufficient to satisfy condition (3), and it is therefore technically difficult to provide an image-acquisition apparatus that satisfies condition (3). In contrast, this embodiment facilitates the manufacture of such an image-acquisition apparatus 1.

Although the first holding frame 4 used in this embodiment is of a unibody construction, the first holding frame 4 can be designed in any suitable manner. For example, the first holding frame 4 may be composed of a plurality of holding frames, each holding at least one lens.

If the first holding frame 4 is composed of a plurality of holding frames, one of the plurality of holding frames may be configured to be movable along the optical axis. This allows one of the lenses L1 and L2 that form the first group G1 to be movable along the optical axis to provide a focus function for the objective lens 2 without affecting focusing. The movable lens is preferably the lens of the first group G1 that is located closest to the image side.

EXAMPLES

Examples 1 to 16 of the image-acquisition apparatus 1 according to the foregoing embodiment will be described below with reference to FIGS. 2 to 20B.

In the lens data for objective lenses shown in the examples, r is the radius of curvature (mm), d is the distance between lens surfaces (mm), ne is the refractive index at the e-line, Ve is the Abbe number at the e-line, OBJ (surface No.=0) is the object plane, IMG is the image plane, and S is the aperture stop. In the drawings, the holding frames and the image-acquisition device are not shown except for some examples. Table 1 summarizes the f-number of the objective lens, the pixel pitch P of the image-acquisition device, the focal length f_front of the first group, and the focal length f_rear of the second group G2 for each example.

Example 1

Figure 2:
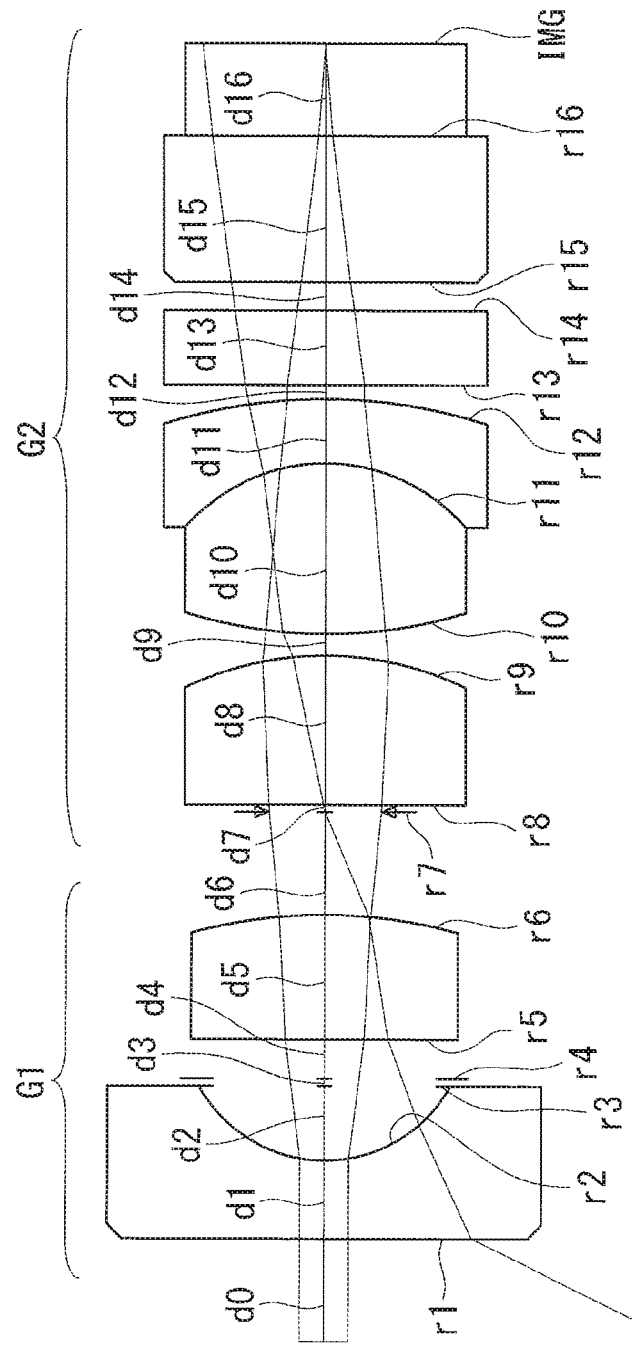
FIG. 2 is a sectional view illustrating a partial configuration of an image-acquisition apparatus according to Example 1 of the present invention.

As shown in FIG. 2, an image-acquisition apparatus according to this example includes an objective lens having the same lens configuration as the objective lens 2 described above.

Lens data

| surface number | r | d | ne | Ve |
|---|---|---|---|---|
| OBJ | ∞ | 19.0000 | 1. | |
| 1 | ∞ | 0.3661 | 1.88815 | 40.52 |
| 2 | 0.7322 | 0.3514 | 1. | |
| 3 | ∞ | 0.0380 | 1. | |
| 4 | ∞ | 0.1819 | 1. | |
| 5 | ∞ | 0.5857 | 1.93429 | 18.74 |
| 6 | −3.0974 | 0.5103 | 1. | |
| 7(S) | ∞ | 0.0320 | 1. | |
| 8 | ∞ | 0.6950 | 1.75844 | 52.08 |
| 9 | −1.6553 | 0.1111 | 1. | |
| 10 | 2.4595 | 0.8206 | 1.73234 | 54.45 |
| 11 | −0.9633 | 0.3075 | 1.93429 | 18.74 |
| 12 | −2.9286 | 0.0730 | 1. | |
| 13 | ∞ | 0.3581 | 1.51564 | 74.74 |
| 14 | ∞ | 0.1285 | 1. | |
| 15 | ∞ | 0.6857 | 1.51825 | 63.93 |
| 16 | ∞ | 0.4457 | 1.61350 | 50.20 |
| IMG | ∞ | 0. | | |

Example 2

Figure 3:
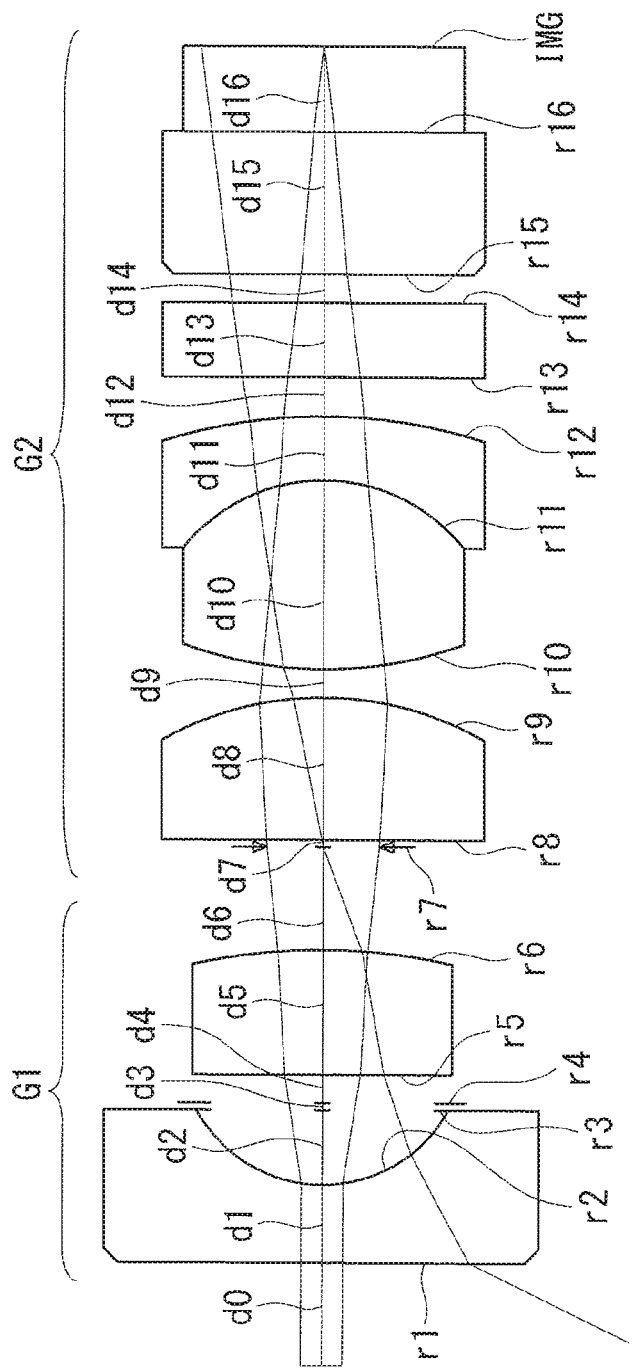
FIG. 3 is a sectional view illustrating a partial configuration of an image-acquisition apparatus according to Example 2 of the present invention.
Figure 4:
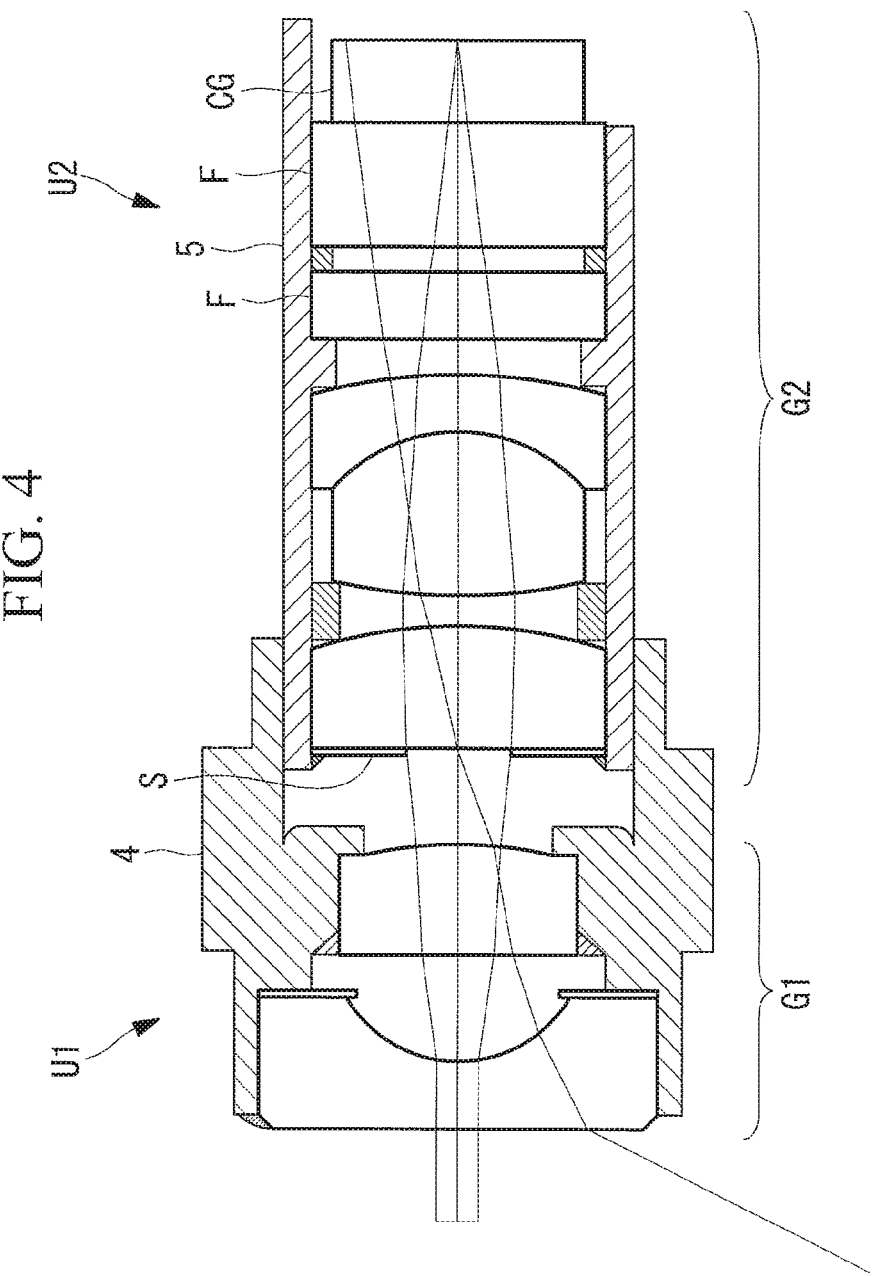
FIG. 4 is a sectional view illustrating a configuration in which holding frames are attached to the objective lens in FIG. 3.

As shown in FIG. 3, an image-acquisition apparatus according to this example includes an objective lens having the same lens configuration as the objective lens 2 described above. FIG. 4 is an overall configuration diagram of the image-acquisition apparatus according to this example.

Lens data

| surface number | r | d | ne | Ve |
|---|---|---|---|---|
| OBJ | ∞ | 14.6000 | 1. | |
| 1 | ∞ | 0.3577 | 1.88815 | 40.52 |
| 2 | 0.6932 | 0.3434 | 1. | |
| 3 | ∞ | 0.0360 | 1. | |
| 4 | ∞ | 0.1536 | 1. | |
| 5 | ∞ | 0.5724 | 1.93429 | 18.74 |
| 6 | −4.7993 | 0.5122 | 1. | |
| 7(S) | ∞ | 0.0380 | 1. | |
| 8 | ∞ | 0.6506 | 1.83932 | 36.92 |
| 9 | −1.6294 | 0.1543 | 1. | |
| 10 | 2.4907 | 0.8919 | 1.73234 | 54.45 |
| 11 | −0.8773 | 0.3005 | 1.93429 | 18.74 |
| 12 | −2.8619 | 0.1712 | 1. | |
| 13 | ∞ | 0.3590 | 1.51564 | 74.74 |
| 14 | ∞ | 0.1256 | 1. | |
| 15 | ∞ | 0.6687 | 1.51825 | 63.93 |
| 16 | ∞ | 0.4356 | 1.61350 | 50.20 |
| IMG | ∞ | 0. | | |

Example 3

Figure 5:
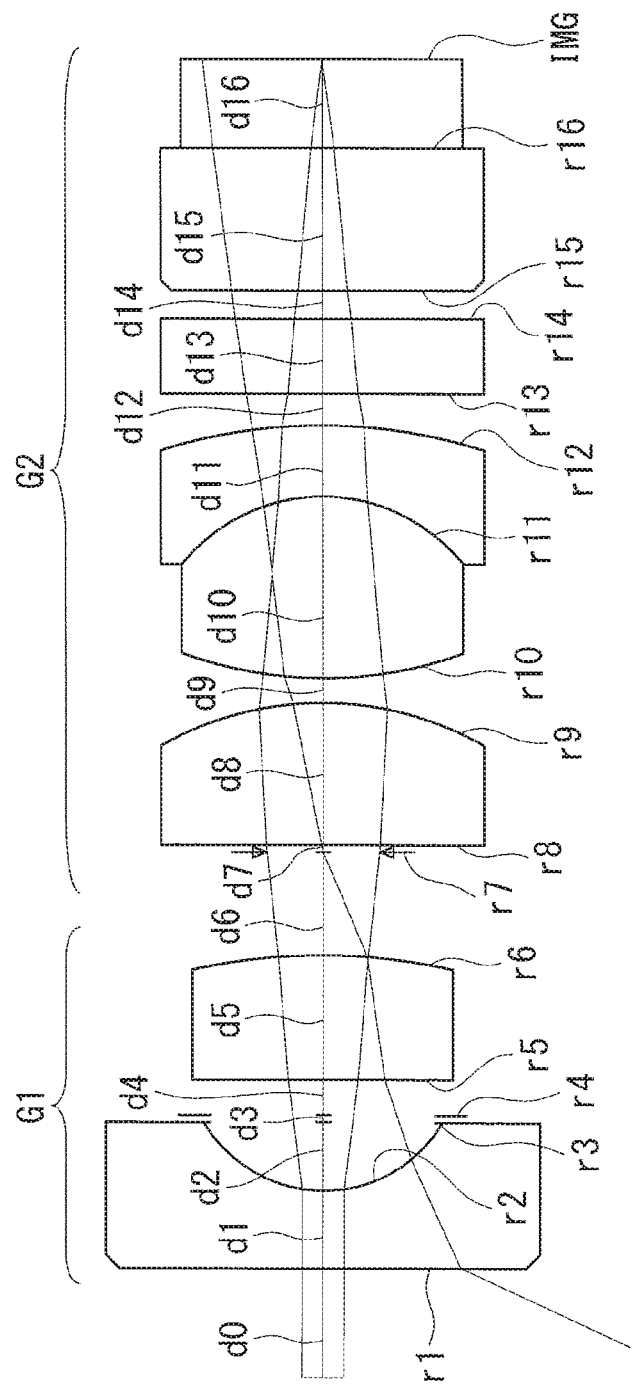
FIG. 5 is a sectional view illustrating a partial configuration of an image-acquisition apparatus according to Example 3 of the present invention.

As shown in FIG. 5, an image-acquisition apparatus according to this example includes an objective lens having the same lens configuration as the objective lens 2 described above.

Example 4

Figure 6:
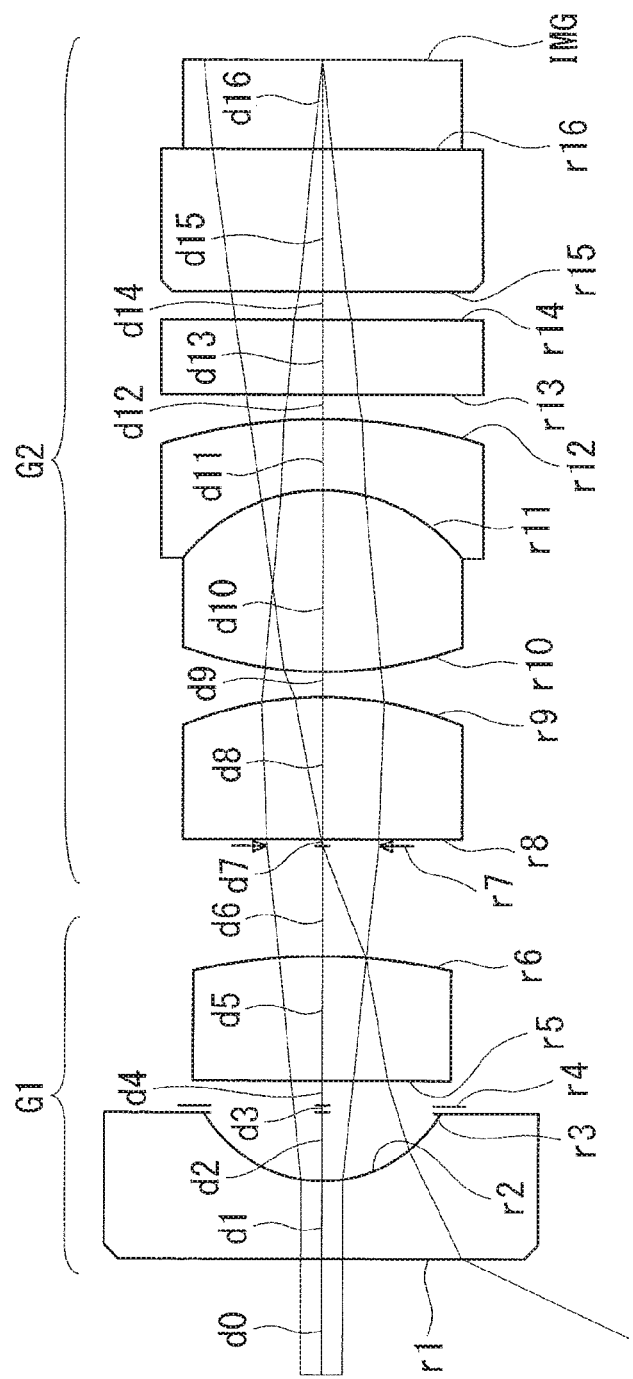
FIG. 6 is a sectional view illustrating a partial configuration of an image-acquisition apparatus according to Example 4 of the present invention.

As shown in FIG. 6, an image-acquisition apparatus according to this example includes an objective lens having the same lens configuration as the objective lens 2 described above.

| Lens data | | | | |
|---|---|---|---|---|
| surface number | r | d | ne | Ve |
| OBJ | ∞ | 12.0000 | 1. | |
| 1 | ∞ | 0.3411 | 1.88815 | 40.52 |
| 2 | 0.6614 | 0.3274 | 1. | |
| 3 | ∞ | 0.0317 | 1. | |
| 4 | ∞ | 0.1494 | 1. | |
| 5 | ∞ | 0.5457 | 1.93429 | 18.74 |
| 6 | −4.2977 | 0.4924 | 1. | |
| 7(S) | ∞ | 0.0280 | 1. | |
| 8 | ∞ | 0.6122 | 1.83932 | 36.92 |
| 9 | −1.5482 | 0.1291 | 1. | |
| 10 | 2.3993 | 0.8433 | 1.73234 | 54.45 |
| 11 | −0.8296 | 0.2865 | 1.93429 | 18.74 |
| 12 | −2.7286 | 0.1563 | 1. | |
| 13 | ∞ | 0.3336 | 1.51564 | 74.74 |
| 14 | ∞ | 0.1297 | 1. | |
| 15 | ∞ | 0.6389 | 1.51825 | 63.93 |
| 16 | ∞ | 0.4153 | 1.61350 | 50.20 |
| IMG | ∞ | 0. | | |

Example 5

Figure 7:
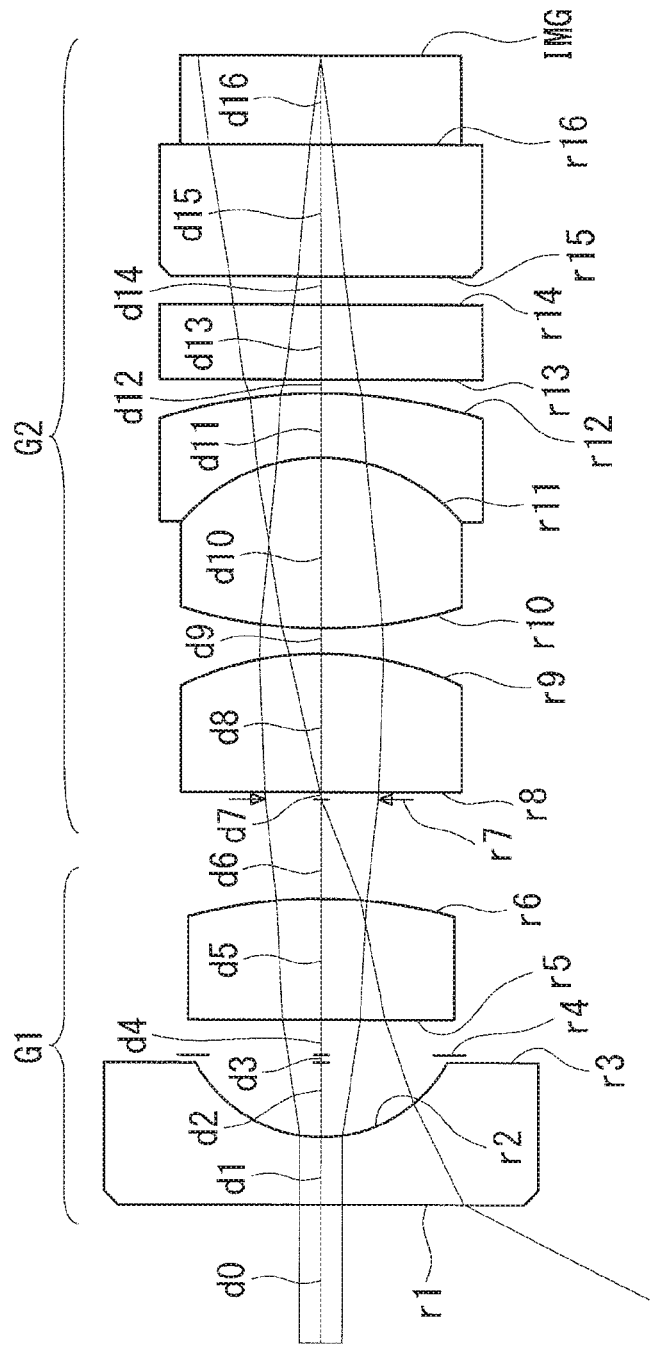
FIG. 7 is a sectional view illustrating a partial configuration of an image-acquisition apparatus according to Example 5 of the present invention.

As shown in FIG. 7, an image-acquisition apparatus according to this example includes an objective lens having the same lens configuration as the objective lens 2 described above.

| Lens data | | | | |
|---|---|---|---|---|
| surface number | r | d | ne | Ve |
| OBJ | ∞ | 11.4000 | 1. | |
| 1 | ∞ | 0.3214 | 1.88815 | 40.52 |
| 2 | 0.6221 | 0.3086 | 1. | |
| 3 | ∞ | 0.0263 | 1. | |
| 4 | ∞ | 0.0988 | 1. | |
| 5 | ∞ | 0.5143 | 1.93429 | 18.74 |
| 6 | −3.7203 | 0.4759 | 1. | |
| 7(S) | ∞ | 0.0351 | 1. | |
| 8 | ∞ | 0.5990 | 1.83932 | 36.92 |
| 9 | −1.4429 | 0.1082 | 1. | |
| 10 | 2.2333 | 0.7753 | 1.73234 | 54.45 |
| 11 | −0.7872 | 0.2700 | 1.93429 | 18.74 |
| 12 | −2.5714 | 0.1249 | 1. | |
| 13 | ∞ | 0.3144 | 1.51564 | 74.74 |
| 14 | ∞ | 0.1128 | 1. | |
| 15 | ∞ | 0.6021 | 1.51825 | 63.93 |
| 16 | ∞ | 0.3913 | 1.61350 | 50.20 |
| IMG | ∞ | 0. | | |

Example 6

Figure 8:
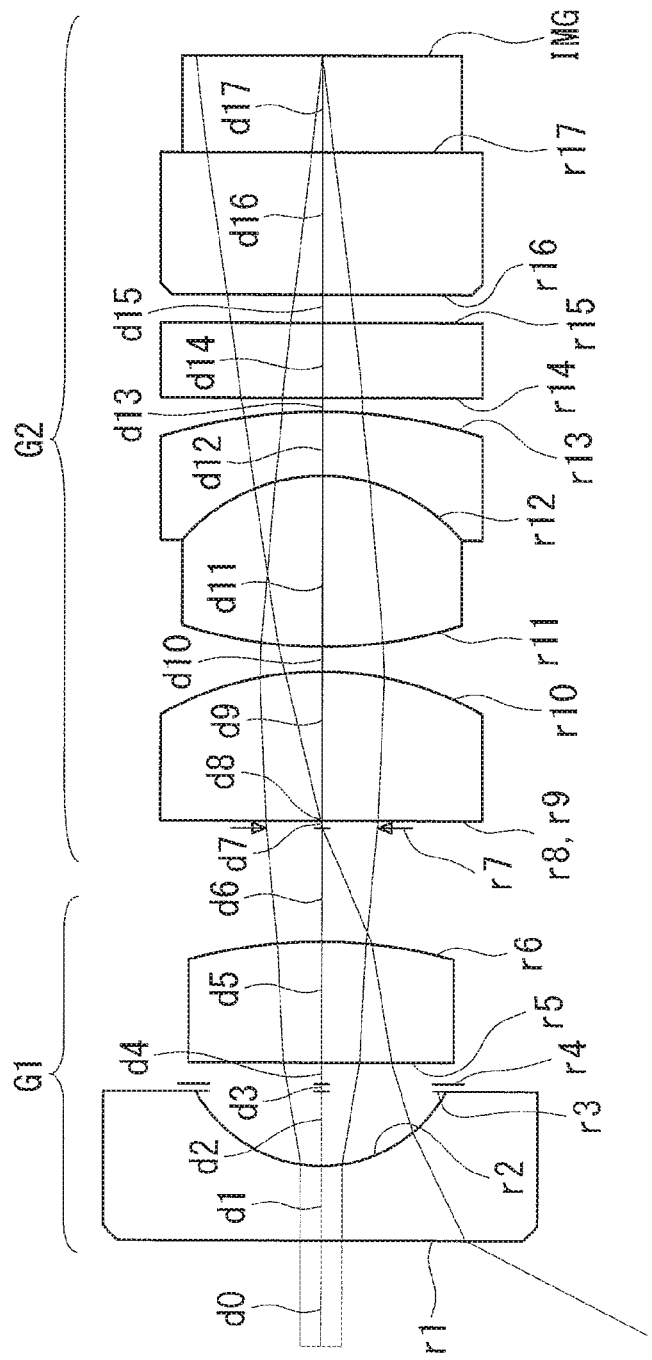
FIG. 8 is a sectional view illustrating a partial configuration of an image-acquisition apparatus according to Example 6 of the present invention.

As shown in FIG. 8, an image-acquisition apparatus according to this example includes an objective lens having the same lens configuration as the objective lens 2 described above.

| Lens data | | | | |
|---|---|---|---|---|
| surface number | r | d | ne | Ve |
| OBJ | ∞ | 10.7000 | 1. | |
| 1 | ∞ | 0.2619 | 1.88815 | 40.52 |
| 2 | 0.5208 | 0.2514 | 1. | |
| 3 | ∞ | 0.0215 | 1. | |
| 4 | ∞ | 0.1301 | 1. | |
| 5 | ∞ | 0.4190 | 1.93429 | 18.74 |
| 6 | −2.4059 | 0.3677 | 1. | |
| 7(S) | ∞ | 0.0286 | 1. | |
| 8 | ∞ | 0.4874 | 1.75844 | 52.08 |
| 9 | −1.1614 | 0.0895 | 1. | |
| 10 | 1.7737 | 0.6027 | 1.73234 | 54.45 |
| 11 | −0.6788 | 0.2200 | 1.93429 | 18.74 |
| 12 | −2.0952 | 0.0720 | 1. | |
| 13 | ∞ | 0.2562 | 1.51564 | 74.74 |
| 14 | ∞ | 0.0919 | 1. | |
| 15 | ∞ | 0.4906 | 1.51825 | 63.93 |
| 16 | ∞ | 0.3189 | 1.61350 | 50.20 |
| IMG | ∞ | 0. | | |

Example 7

Figure 9:
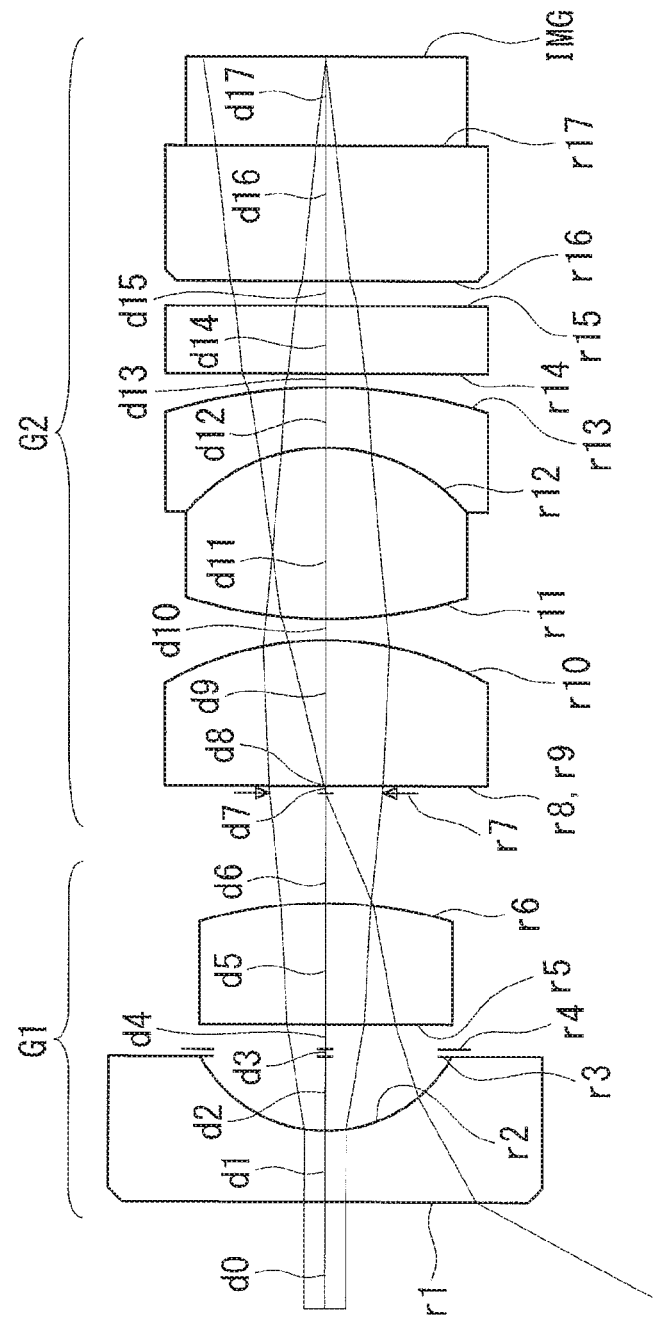
FIG. 9 is a sectional view illustrating a partial configuration of an image-acquisition apparatus according to Example 7 of the present invention.

As shown in FIG. 9, an image-acquisition apparatus according to this example includes an objective lens having the same lens configuration as the objective lens 2 described above.

| Lens data | | | | |
|---|---|---|---|---|
| surface number | r | d | ne | Ve |
| OBJ | ∞ | 13.0000 | 1. | |
| 1 | ∞ | 0.3661 | 1.88815 | 40.52 |
| 2 | 0.7238 | 0.3514 | 1. | |
| 3 | ∞ | 0.0314 | 1. | |
| 4 | ∞ | 0.1000 | 1. | |
| 5 | ∞ | 0.5857 | 1.93429 | 18.74 |
| 6 | −3.1427 | 0.5390 | 1. | |
| 7(S) | ∞ | 0.0329 | 1. | |
| 8 | ∞ | 0. | 1. | |
| 9 | ∞ | 0.7082 | 1.75844 | 52.08 |
| 10 | −1.5656 | 0.1037 | 1. | |
| 11 | 2.4110 | 0.8198 | 1.73234 | 54.45 |
| 12 | −0.9553 | 0.3075 | 1.93429 | 18.74 |
| 13 | −2.9286 | 0.0683 | 1. | |
| 14 | ∞ | 0.3581 | 1.51564 | 74.74 |
| 15 | ∞ | 0.1150 | 1. | |
| 16 | ∞ | 0.6857 | 1.51825 | 63.93 |
| 17 | ∞ | 0.4457 | 1.61350 | 50.20 |
| IMG | ∞ | 0. | | |

| Lens data | | | | |
|---|---|---|---|---|
| surface number | r | d | ne | Ve |
| OBJ | ∞ | 12.4000 | 1. | |
| 1 | ∞ | 0.3494 | 1.88815 | 40.52 |
| 2 | 0.6952 | 0.3354 | 1. | |
| 3 | ∞ | 0.0382 | 1. | |
| 4 | ∞ | 0.0954 | 1. | |
| 5 | ∞ | 0.5590 | 1.93429 | 18.74 |
| 6 | −2.7980 | 0.5118 | 1. | |
| 7(S) | ∞ | 0.0286 | 1. | |
| 8 | ∞ | 0. | 1. | |
| 9 | ∞ | 0.6886 | 1.75844 | 52.08 |
| 10 | −1.5044 | 0.0948 | 1. | |

-continued

| Lens data | | | | |
|---|---|---|---|---|
| surface number | r | d | ne | Ve |
| 11 | 2.2870 | 0.7717 | 1.73234 | 54.45 |
| 12 | −0.9201 | 0.2935 | 1.93429 | 18.74 |
| 13 | −2.7952 | 0.0724 | 1. | |
| 14 | ∞ | 0.3186 | 1.51564 | 74.74 |
| 15 | ∞ | 0.1098 | 1. | |
| 16 | ∞ | 0.6113 | 1.51825 | 63.93 |
| 17 | ∞ | 0.4254 | 1.61350 | 50.20 |
| IMG | ∞ | 0. | | |

Example 8

Figure 10:
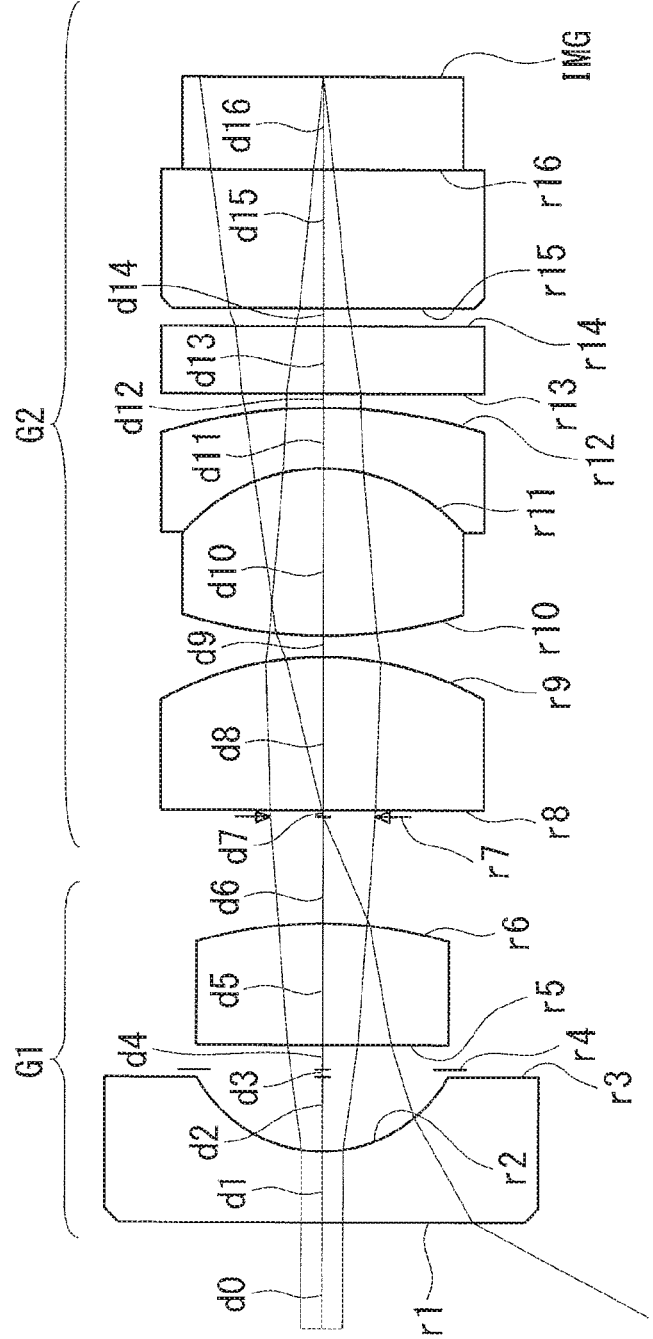
FIG. 10 is a sectional view illustrating a partial configuration of an image-acquisition apparatus according to Example 8 of the present invention.

As shown in FIG. 10, an image-acquisition apparatus according to this example includes an objective lens having the same lens configuration as the objective lens 2 described above.

| Lens data | | | | |
|---|---|---|---|---|
| surface number | r | d | ne | Ve |
| OBJ | ∞ | 12.6000 | 1. | |
| 1 | ∞ | 0.3560 | 1.88815 | 40.52 |
| 2 | 0.7140 | 0.3417 | 1. | |
| 3 | ∞ | 0.0282 | 1. | |
| 4 | ∞ | 0.1051 | 1. | |
| 5 | ∞ | 0.5529 | 1.85504 | 23.59 |
| 6 | −2.4207 | 0.5139 | 1. | |
| 7(S) | ∞ | 0.0306 | 1. | |
| 8 | ∞ | 0.7138 | 1.73234 | 54.45 |
| 9 | −1.5001 | 0.0921 | 1. | |
| 10 | 2.3004 | 0.7686 | 1.73234 | 54.45 |
| 11 | −0.9296 | 0.2990 | 1.93429 | 18.74 |
| 12 | −2.8476 | 0.0537 | 1. | |
| 13 | ∞ | 0.3124 | 1.51564 | 74.74 |
| 14 | ∞ | 0.1118 | 1. | |
| 15 | ∞ | 0.6309 | 1.51825 | 63.93 |
| 16 | ∞ | 0.4334 | 1.61350 | 50.20 |
| IMG | ∞ | 0. | | |

Example 9

Figure 11:
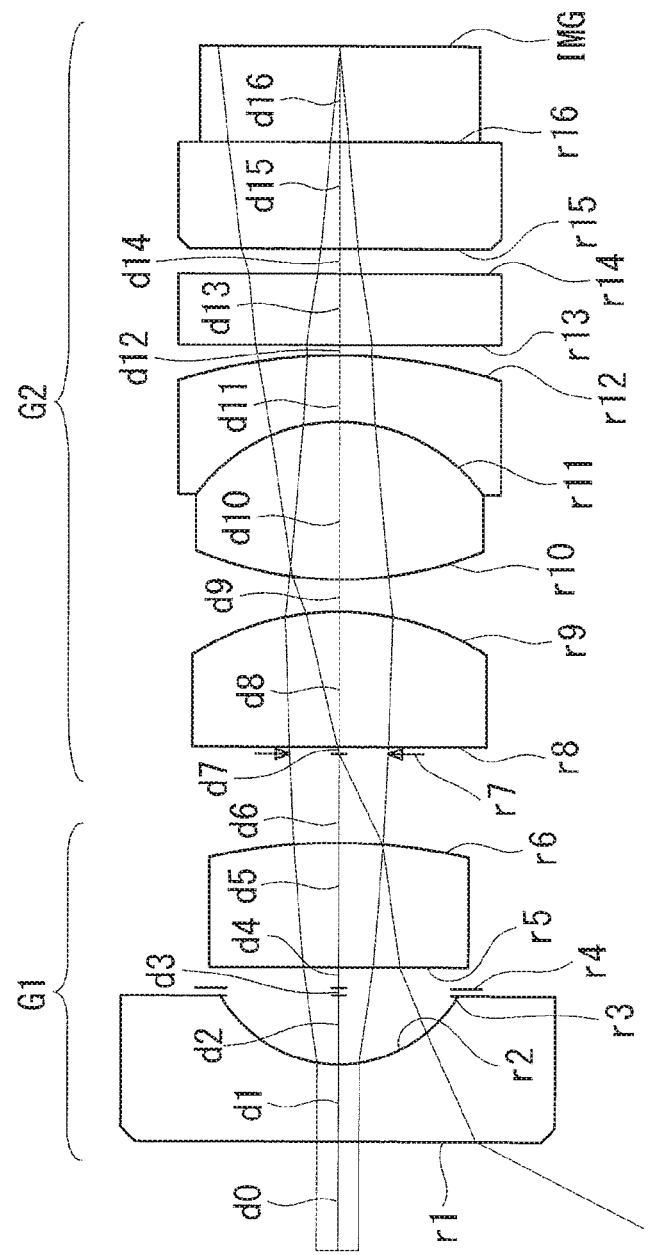
FIG. 11 is a sectional view illustrating a partial configuration of an image-acquisition apparatus according to Example 9 of the present invention.

As shown in FIG. 11, an image-acquisition apparatus according to this example includes an objective lens having the same lens configuration as the objective lens 2 described above.

| Lens data | | | | |
|---|---|---|---|---|
| surface number | r | d | ne | Ve |
| OBJ | ∞ | 12.8000 | 1. | |
| 1 | ∞ | 0.3619 | 1.88815 | 40.52 |
| 2 | 0.7055 | 0.3474 | 1. | |
| 3 | ∞ | 0.0247 | 1. | |
| 4 | ∞ | 0.0989 | 1. | |
| 5 | ∞ | 0.5790 | 1.93429 | 18.74 |
| 6 | −2.7804 | 0.4289 | 1. | |
| 7(S) | ∞ | 0.0277 | 1. | |
| 8 | ∞ | 0.6612 | 1.75844 | 52.08 |
| 9 | −1.3431 | 0.1689 | 1. | |
| 10 | 2.5961 | 0.7415 | 1.73234 | 54.45 |
| 11 | −0.8733 | 0.3040 | 1.93429 | 18.74 |
| 12 | −2.8952 | 0.0542 | 1. | |
| 13 | ∞ | 0.3404 | 1.51564 | 74.74 |
| 14 | ∞ | 0.1137 | 1. | |
| 15 | ∞ | 0.5258 | 1.51825 | 63.93 |

-continued

| Lens data | | | | |
|---|---|---|---|---|
| surface number | r | d | ne | Ve |
| 16 | ∞ | 0.4406 | 1.61350 | 50.20 |
| IMG | ∞ | 0. | | |

Example 10

Figure 12:
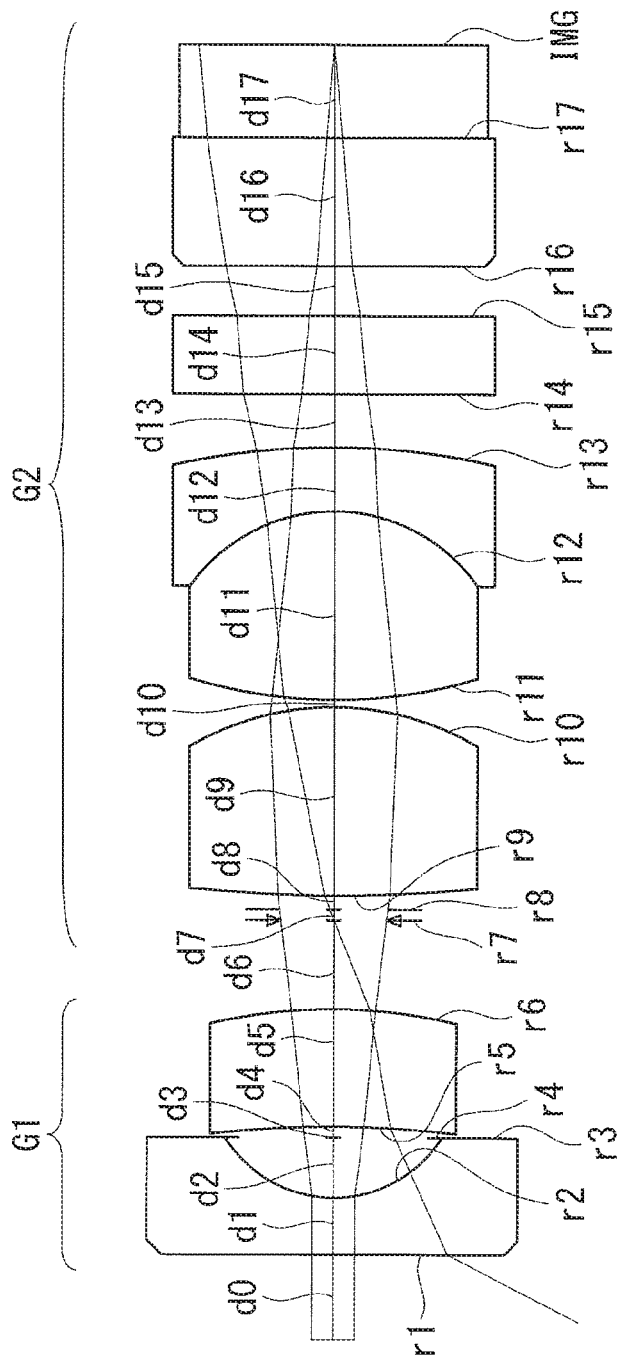
FIG. 12 is a sectional view illustrating a partial configuration of an image-acquisition apparatus according to Example 10 of the present invention.

As shown in FIG. 12, an image-acquisition apparatus according to this example includes an objective lens having the same lens configuration as the objective lens 2 described above except that the lens L2 of the first group G1 is a meniscus lens and that the lens L3 of the second group is a biconvex lens.

| Lens data | | | | |
|---|---|---|---|---|
| surface number | r | d | ne | Ve |
| OBJ | ∞ | 16.8000 | | |
| 1 | ∞ | 0.3701 | 1.88815 | 40.52 |
| 2 | 0.8068 | 0.3683 | 1. | |
| 3 | ∞ | 0.0276 | 1. | |
| 4 | ∞ | 0.0460 | 1. | |
| 5 | −9.2080 | 0.7040 | 1.85504 | 23.59 |
| 6 | −4.3114 | 0.5609 | 1. | |
| 7 (S) | ∞ | 0.0555 | 1. | |
| 8 | ∞ | 0.0925 | 1. | |
| 9 | 8.7429 | 1.1683 | 1.83932 | 36.92 |
| 10 | −1.9192 | 0.0488 | 1. | |
| 11 | 4.0232 | 1.1510 | 1.69979 | 55.31 |
| 12 | −1.1626 | 0.3996 | 1.93429 | 18.74 |
| 13 | −5.5974 | 0.3272 | 1. | |
| 14 | ∞ | 0.4906 | 1.51564 | 74.74 |
| 15 | ∞ | 0.3062 | 1. | |
| 16 | ∞ | 0.7083 | 1.51825 | 63.93 |
| 17 | ∞ | 0.6524 | 1.61350 | 50.20 |
| IMG | ∞ | 0. | | |

Example 11

Figure 13:
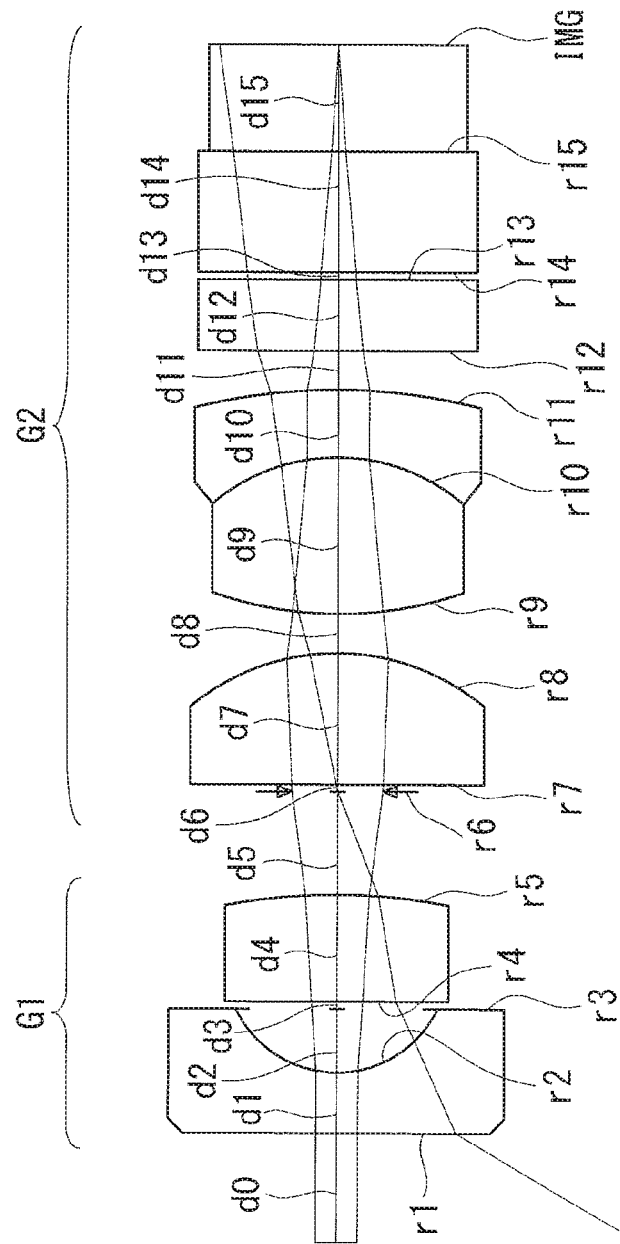
FIG. 13 is a sectional view illustrating a partial configuration of an image-acquisition apparatus according to Example 11 of the present invention.

As shown in FIG. 13, an image-acquisition apparatus according to this example includes an objective lens having the same lens configuration as the objective lens 2 described above.

| Lens data | | | | |
|---|---|---|---|---|
| surface number | r | d | ne | Ve |
| OBJ | ∞ | 15.0000 | | |
| 1 | ∞ | 0.2515 | 1.77066 | 70.28 |
| 2 | 0.5345 | 0.2641 | 1. | |
| 3 | ∞ | 0.0377 | 1. | |
| 4 | ∞ | 0.4401 | 1.88815 | 40.52 |
| 5 | −5.7202 | 0.4457 | 1. | |
| 6(S) | ∞ | 0.0377 | 1. | |
| 7 | ∞ | 0.5659 | 1.82017 | 46.37 |
| 8 | −1.1066 | 0.1635 | 1. | |
| 9 | 1.9954 | 0.6916 | 1.69979 | 55.31 |
| 10 | −0.9053 | 0.2767 | 1.93429 | 18.74 |
| 11 | −3.8581 | 0.1652 | 1. | |
| 12 | ∞ | 0.3065 | 1.51564 | 74.74 |
| 13 | ∞ | 0.0420 | 1. | |
| 14 | ∞ | 0.5030 | 1.51825 | 63.93 |
| 15 | ∞ | 0.4687 | 1.61350 | 49.91 |
| IMG | ∞ | 0. | | |

Example 12

Figure 14:
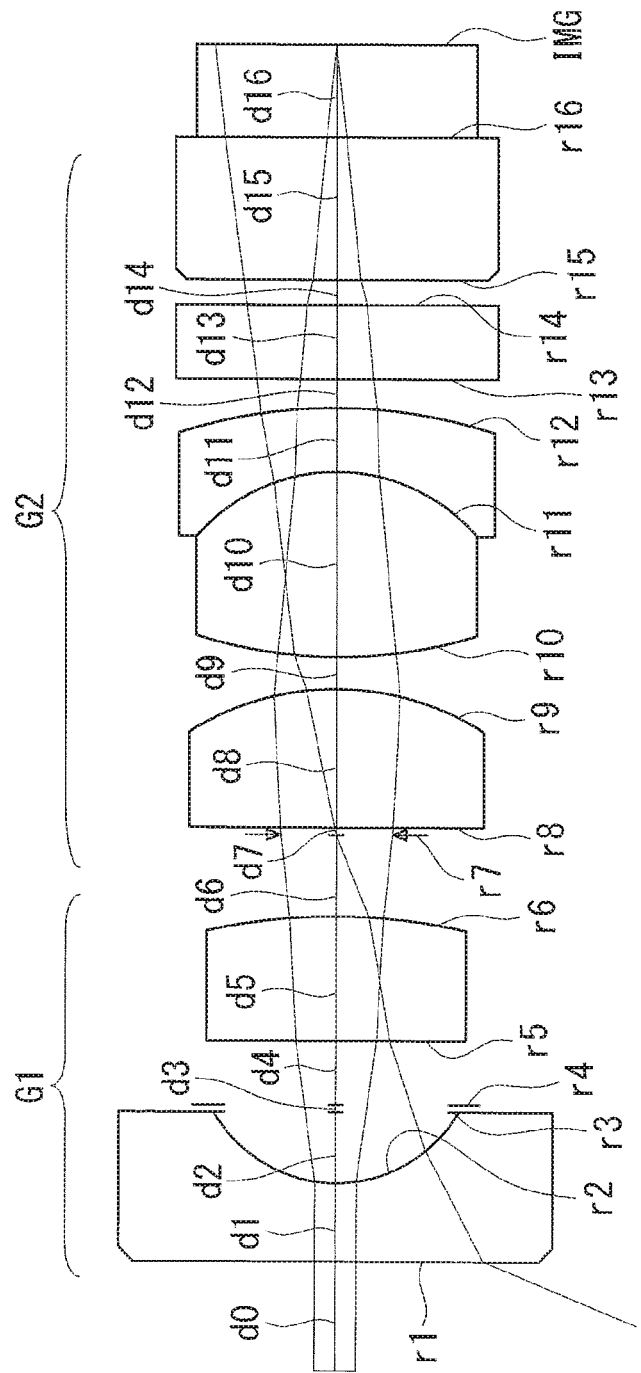
FIG. 14 is a sectional view illustrating a partial configuration of an image-acquisition apparatus according to Example 12 of the present invention.

As shown in FIG. 14, an image-acquisition apparatus according to this example includes an objective lens having the same lens configuration as the objective lens 2 described above.

| Lens data | | | | |
|---|---|---|---|---|
| surface number | r | d | ne | Ve |
| OBJ | ∞ | 18.7000 | 1. | |
| 1 | ∞ | 0.3619 | 1.88815 | 40.52 |
| 2 | 0.7070 | 0.3474 | 1. | |
| 3 | ∞ | 0.0475 | 1. | |
| 4 | ∞ | 0.2787 | 1. | |
| 5 | ∞ | 0.5790 | 1.93429 | 18.74 |
| 6 | −4.3429 | 0.4119 | 1. | |
| 7 (S) | ∞ | 0.0376 | 1. | |
| 8 | ∞ | 0.6514 | 1.75844 | 52.08 |
| 9 | −1.5674 | 0.1593 | 1. | |
| 10 | 2.4701 | 0.8686 | 1.73234 | 54.45 |
| 11 | −0.9239 | 0.3040 | 1.93429 | 18.74 |
| 12 | −2.8952 | 0.1322 | 1. | |
| 13 | ∞ | 0.3540 | 1.51564 | 74.74 |
| 14 | ∞ | 0.1270 | 1. | |
| 15 | ∞ | 0.6779 | 1.51825 | 63.93 |
| 16 | ∞ | 0.4406 | 1.61350 | 50.20 |
| IMG | ∞ | 0. | | |

Example 13

Figure 15:
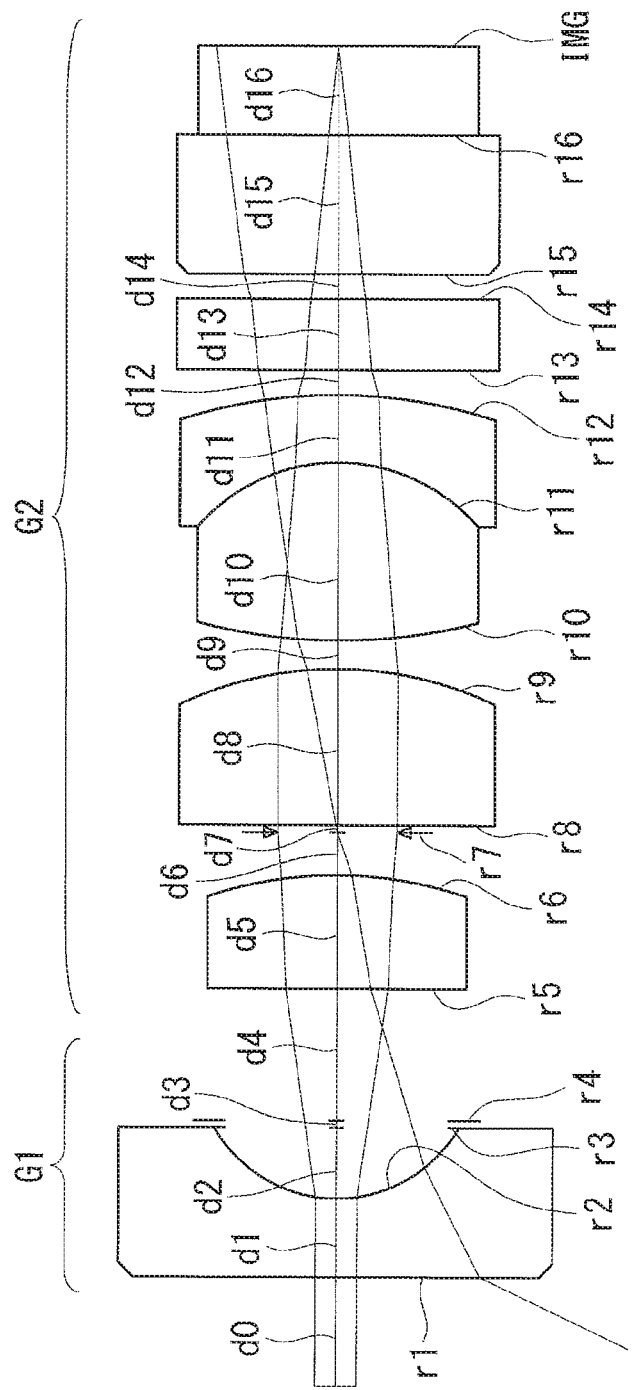
FIG. 15 is a sectional view illustrating a partial configuration of an image-acquisition apparatus according to Example 13 of the present invention.

As shown in FIG. 15, an image-acquisition apparatus according to this example includes an objective lens that differs from the objective lens 2 described above in the position where the first group G1 and the second group are separated, specifically, in that the first group G1 is composed of a single lens and that the second group G2 extends beyond the aperture stop S.

| Lens data | | | | |
|---|---|---|---|---|
| surface number | r | d | ne | Ve |
| OBJ | ∞ | 12.7000 | 1 | |
| 1 | ∞ | 0.3589 | 1.88815 | 40.52 |
| 2 | 0.6676 | 0.3596 | 1. | |
| 3 | ∞ | 0.0431 | 1. | |
| 4 | ∞ | 0.5975 | 1. | |
| 5 | 56.6651 | 0.5606 | 1.88815 | 40.52 |
| 6 | −2.1468 | 0.1961 | 1. | |
| 7(S) | ∞ | 0.0405 | 1. | |
| 8 | ∞ | 0.7367 | 1.83932 | 36.92 |
| 9 | −2.2285 | 0.1580 | 1. | |
| 10 | 3.4892 | 0.8614 | 1.73234 | 54.45 |
| 11 | −0.8879 | 0.3015 | 1.93429 | 18.74 |
| 12 | −3.0066 | 0.1233 | 1. | |
| 13 | ∞ | 0.3511 | 1.51564 | 74.74 |
| 14 | ∞ | 0.1183 | 1. | |
| 15 | ∞ | 0.6556 | 1.51825 | 63.93 |
| 16 | ∞ | 0.4370 | 1.61350 | 50.20 |
| IMG | ∞ | 0. | | |

Reference Example

Figure 16:
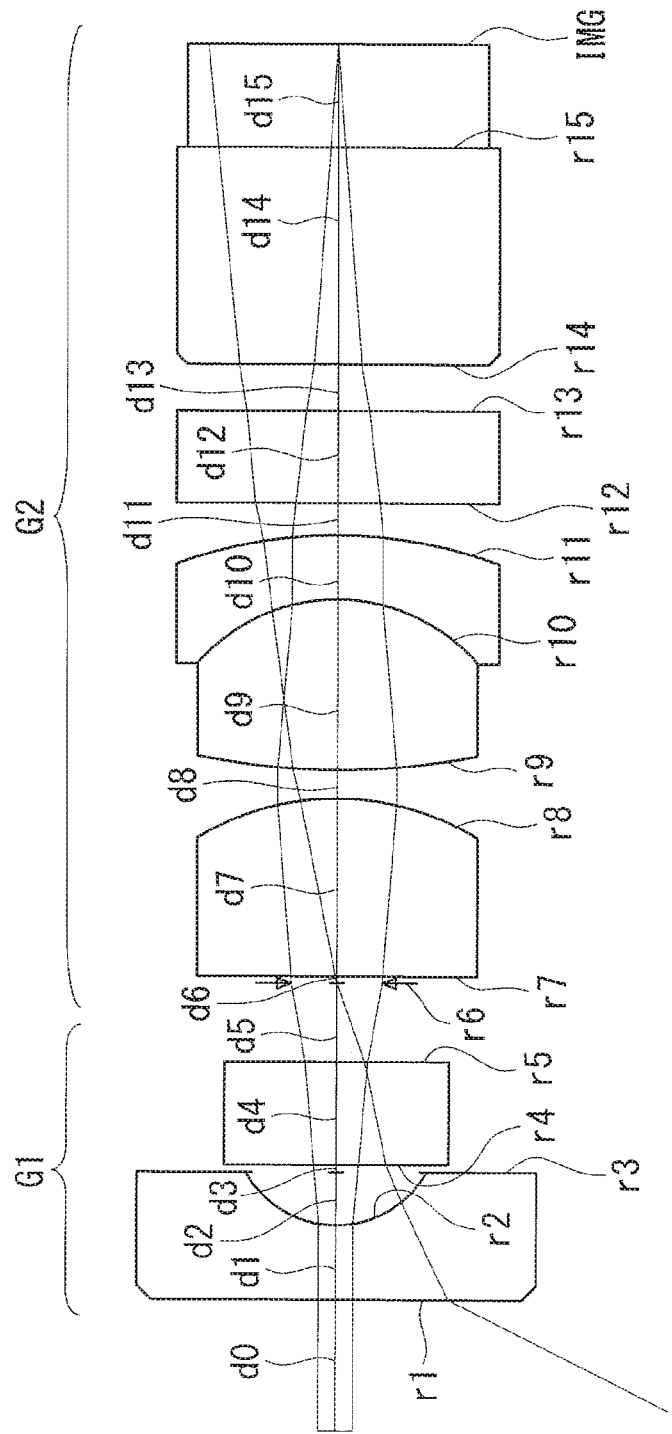
FIG. 16 is a sectional view illustrating a partial configuration of an image-acquisition apparatus according to Reference Example of the present invention.

As shown in FIG. 16, an image-acquisition apparatus according to this example includes an objective lens having the same lens configuration as the objective lens 2 described above.

| Lens data | | | | |
|---|---|---|---|---|
| surface number | r | d | ne | Ve |
| OBJ | ∞ | 10.1000 | | |
| 1 | ∞ | 0.2921 | 1.88815 | 40.52 |
| 2 | 0.4513 | 0.2019 | 1. | |
| 3 | ∞ | 0.0303 | 1. | |
| 4 | ∞ | 0.4039 | 1.93429 | 18.74 |
| 5 | −11.3414 | 0.2873 | 1. | |
| 6(S) | ∞ | 0.0303 | 1. | |
| 7 | ∞ | 0.6838 | 1.88815 | 40.52 |
| 8 | −1.0626 | 0.1111 | 1. | |
| 9 | 3.3235 | 0.6563 | 1.73234 | 54.45 |
| 10 | −0.7418 | 0.2400 | 1.93429 | 18.74 |
| 11 | −2.1541 | 0.1353 | 1. | |
| 12 | ∞ | 0.3474 | 1.51564 | 74.74 |
| 13 | ∞ | 0.1857 | 1. | |
| 14 | ∞ | 0.8321 | 1.51825 | 63.93 |
| 15 | ∞ | 0.4039 | 1.61350 | 50.20 |
| IMG | ∞ | 0. | | |

Example 14

Figure 17:
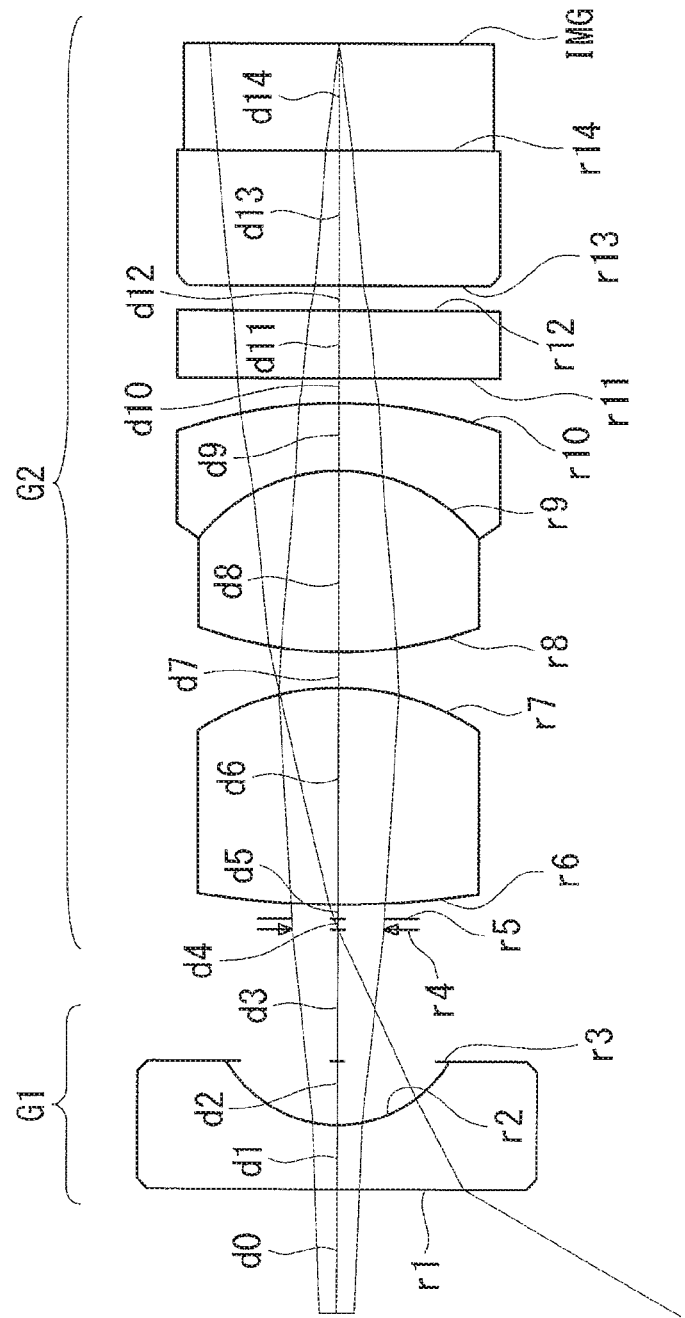
FIG. 17 is a sectional view illustrating a partial configuration of an image-acquisition apparatus according to Example 14 of the present invention.
Figure 18:
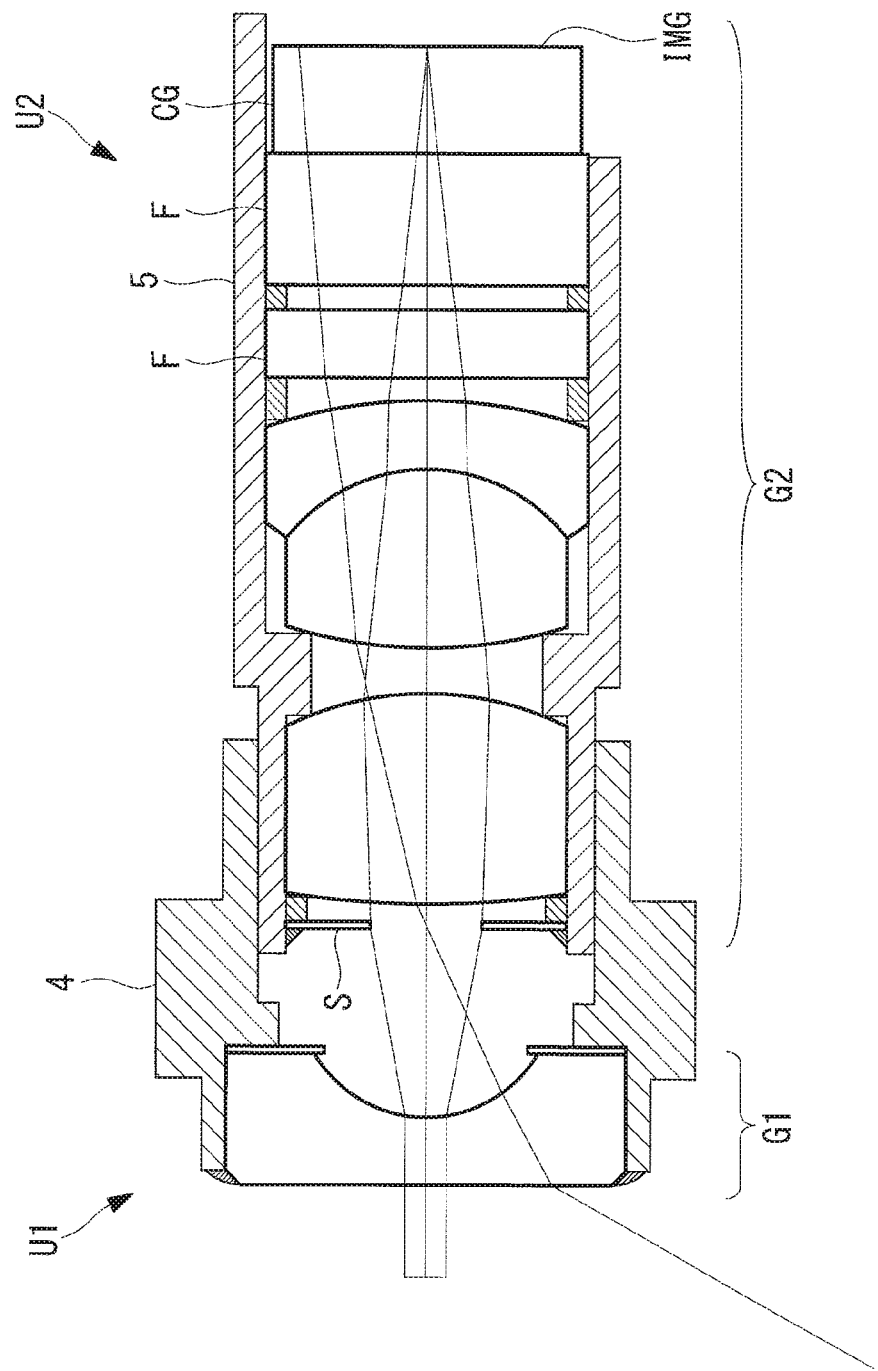
FIG. 18 is a sectional view illustrating a configuration in which holding frames are attached to the objective lens in FIG. 17.

As shown in FIG. 17, an image-acquisition apparatus according to this example includes no lens L2, and the first group G1 is composed of a single lens. FIG. 18 is an overall configuration diagram of the image-acquisition apparatus according to this example.

| Lens data | | | | |
|---|---|---|---|---|
| surface number | r | d | ne | Ve |
| OBJ | ∞ | 11.0000 | 1. | |
| 1 | ∞ | 0.2570 | 1.77066 | 70.28 |
| 2 | 0.5797 | 0.2707 | 1. | |
| 3 | ∞ | 0.5445 | 1. | |
| 4(S) | ∞ | 0.0386 | 1. | |
| 5 | ∞ | 0.0608 | 1. | |
| 6 | 5.6766 | 0.8734 | 1.82017 | 46.37 |
| 7 | −1.1818 | 0.1606 | 1. | |
| 8 | 1.9125 | 0.7479 | 1.59143 | 60.88 |
| 9 | −0.7924 | 0.2839 | 1.93429 | 18.74 |
| 10 | −2.0205 | 0.0960 | 1. | |
| 11 | ∞ | 0.2700 | 1.51965 | 74.73 |
| 12 | ∞ | 0.1060 | 1. | |
| 13 | ∞ | 0.5524 | 1.51825 | 63.93 |
| 14 | ∞ | 0.4358 | 1.61350 | 50.20 |
| IMG | ∞ | 0. | | |

Example 15

Figure 19:
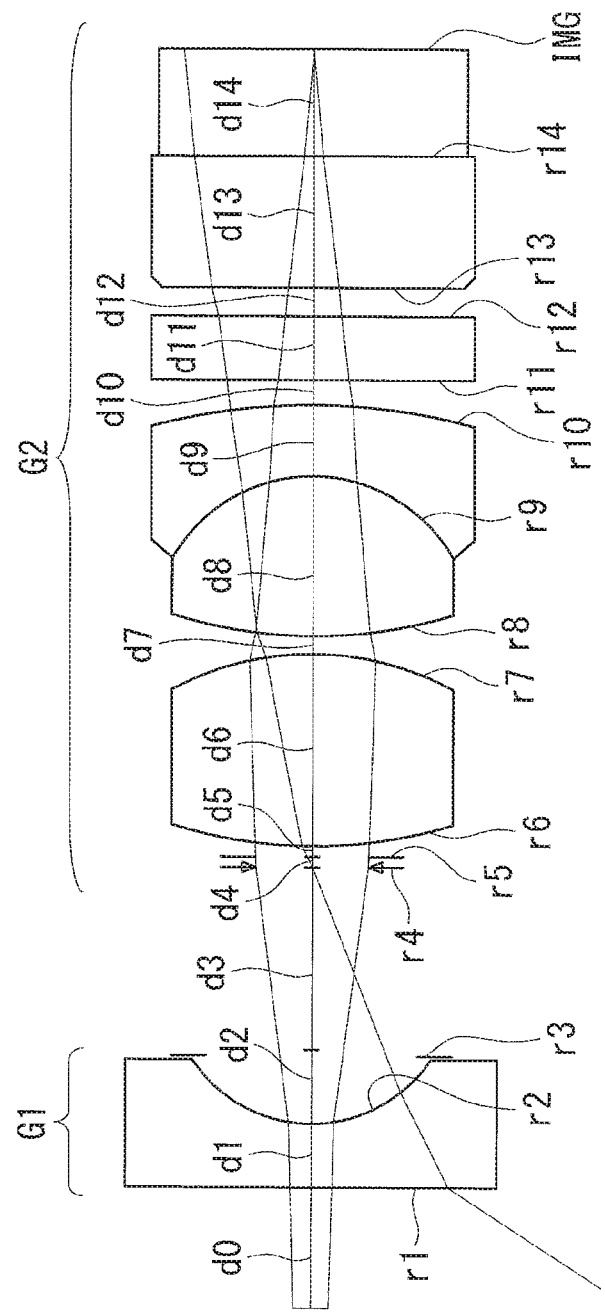
FIG. 19 is a sectional view illustrating a partial configuration of an image-acquisition apparatus according to Example 15 of the present invention.
Figure 20:
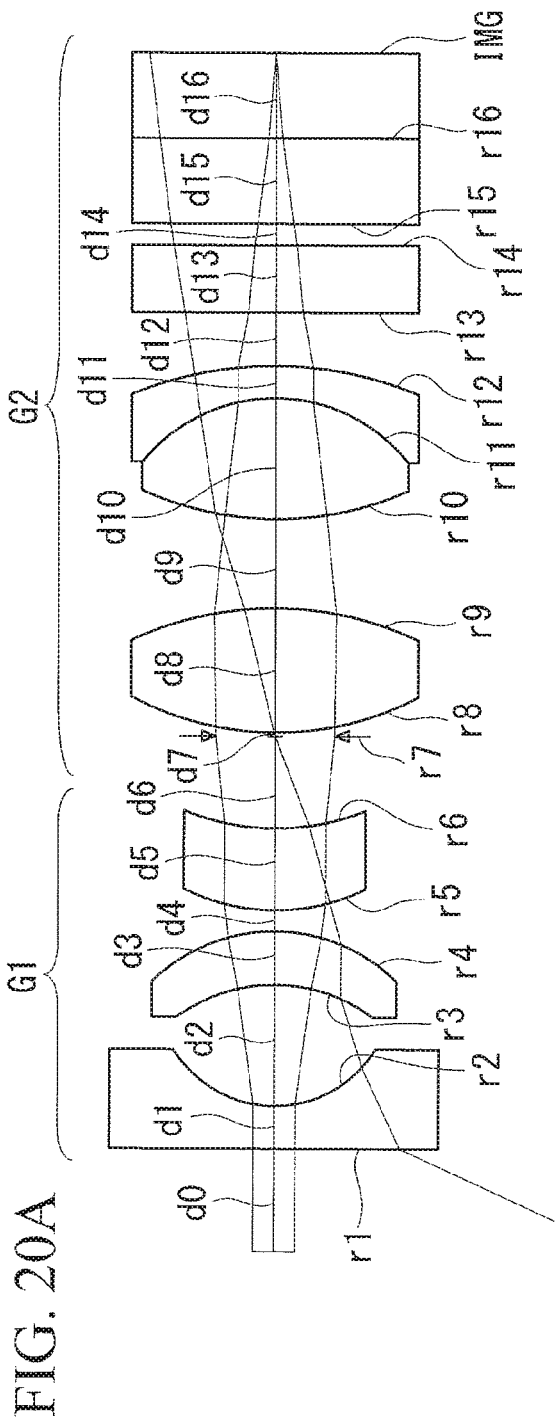
FIG. 20A is sectional views illustrating partial configurations of an image-acquisition apparatus according to Example 16 of the present invention at the wide-angle end.
FIG. 20B is sectional views illustrating partial configurations of an image-acquisition apparatus according to Example 16 of the present invention at the telephoto end.

As shown in FIG. 19, an image-acquisition apparatus according to this example includes no lens L2, and the first group G1 is composed of a single lens.

| Lens data | | | | |
|---|---|---|---|---|
| surface number | r | d | ne | Ve |
| OBJ | ∞ | 11.0000 | 1. | |
| 1 | ∞ | 0.2570 | 1.77066 | 70.28 |
| 2 | 0.6712 | 0.2707 | 1. | |
| 3 | ∞ | 0.7787 | 1. | |
| 4(S) | ∞ | 0.0386 | 1. | |
| 5 | ∞ | 0.0608 | 1. | |
| 6 | 3.3921 | 0.7843 | 1.82017 | 46.37 |
| 7 | −1.2646 | 0.0529 | 1. | |
| 8 | 1.9843 | 0.6783 | 1.59143 | 60.88 |
| 9 | −0.7167 | 0.2839 | 1.93429 | 18.74 |

-continued

| Lens data | | | | |
|---|---|---|---|---|
| surface number | r | d | ne | Ve |
| 10 | −2.4870 | 0.0960 | 1. | |
| 11 | ∞ | 0.2700 | 1.51965 | 74.73 |
| 12 | ∞ | 0.1060 | 1. | |
| 13 | ∞ | 0.5524 | 1.51825 | 63.93 |
| 14 | ∞ | 0.4358 | 1.61350 | 50.20 |
| IMG | ∞ | 0. | | |

Example 16

As shown in FIGS. 20A and 20B, an image-acquisition apparatus according to this example has a focus function. Specifically, the first group G1 is composed of three lenses, and, of these three lenses, the lens that is located closest to the image side (surface No. 5) is a movable lens. The first holding frame is composed of a holding frame A holding the two lenses located on the object side and another holding frame B holding the movable lens located on the image side, and the holding frame B is configured to be movable along the optical axis between the holding frame A and the second holding frame.

| Lens data (wide-angle end) | | | | |
|---|---|---|---|---|
| surface number | r | d | ne | Ve |
| OBJ | ∞ | 15.0000 | 1. | |
| 1 | ∞ | 0.1988 | 1.81991 | 44.11 |
| 2 | 0.6146 | 0.5879 | 1. | |
| 3 | −0.8499 | 0.2505 | 1.88815 | 40.52 |
| 4 | 0.8981 | 0.1034 | 1. | |
| 5 | 1.1431 | 0.3963 | 1.50349 | 56.12 |
| 6 | 1.5007 | 0.4308 | 1. | |
| 7(S) | ∞ | 0.0172 | 1. | |
| 8 | 1.6872 | 0.5945 | 1.48915 | 70.04 |

-continued

| Lens data (wide-angle end) | | | | |
|---|---|---|---|---|
| surface number | r | d | ne | Ve |
| 9 | −1.5507 | 0.4255 | 1. | |
| 10 | 1.5626 | 0.5825 | 1.48915 | 70.04 |
| 11 | −0.8444 | 0.1505 | 1.93429 | 18.74 |
| 12 | −1.8193 | 0.2500 | 1. | |
| 13 | ∞ | 0.3271 | 1.51965 | 74.73 |
| 14 | ∞ | 0.1000 | 1. | |
| 15 | ∞ | 0.3982 | 1.51825 | 63.93 |
| 16 | ∞ | 0.4291 | 1.61350 | 50.20 |
| IMG | ∞ | 0. | | |

| Lens data (telephoto end) | | | | |
|---|---|---|---|---|
| surface number | r | d | ne | Ve |
| OBJ | ∞ | 4.5000 | 1. | |
| 1 | ∞ | 0.1988 | 1.81991 | 44.11 |
| 2 | 0.6146 | 0.5879 | 1. | |
| 3 | −0.8499 | 0.2505 | 1.88815 | 40.52 |
| 4 | −0.8981 | 0.3034 | 1. | |
| 5 | 1.1431 | 0.3963 | 1.50349 | 56.12 |
| 6 | 1.5007 | 0.2308 | 1. | |
| 7(S) | ∞ | 0.0172 | 1. | |
| 8 | 1.6872 | 0.5945 | 1.48915 | 70.04 |
| 9 | −1.5507 | 0.4255 | 1. | |
| 10 | 1.5626 | 0.5825 | 1.48915 | 70.04 |
| 11 | −0.8444 | 0.1505 | 1.93429 | 18.74 |
| 12 | −1.8193 | 0.2500 | 1. | |
| 13 | ∞ | 0.3271 | 1.51965 | 74.73 |
| 14 | ∞ | 0.1000 | 1. | |
| 15 | ∞ | 0.3982 | 1.51825 | 63.93 |
| 16 | ∞ | 0.4291 | 1.61350 | 50.20 |
| IMG | ∞ | 0. | | |

Table 1 shows the values of conditions (1) to (3), pixel pitch P, and f-number Fno for Examples 1 to 16 and Reference Example described above.

TABLE 1

| | Condition (1) | Condition (2) | Condition (3) | P [mm] | Fno | f_front [mm] | f_rear [mm] |
|---|---|---|---|---|---|---|---|
| Example 1 | −2.576 | −1.310 | 0.0071 | 0.0010 | 2.849 | −1.691 | 1.290 |
| Example 2 | −1.767 | −0.911 | 0.0099 | 0.0013 | 3.045 | −1.137 | 1.247 |
| Example 3 | −1.816 | −0.942 | 0.0122 | 0.0016 | 3.049 | −1.118 | 1.186 |
| Example 4 | −1.871 | −0.981 | 0.0089 | 0.0012 | 2.959 | −1.080 | 1.101 |
| Example 5 | −2.343 | −1.195 | 0.0080 | 0.0011 | 2.896 | −1.103 | 0.923 |
| Example 6 | −2.381 | −1.248 | 0.0098 | 0.0014 | 2.811 | −1.555 | 1.246 |
| Example 7 | −2.605 | −1.358 | 0.0090 | 0.0013 | 2.758 | −1.612 | 1.187 |
| Example 8 | −2.871 | −1.498 | 0.0079 | 0.0011 | 2.876 | −1.815 | 1.211 |
| Example 9 | −2.607 | −1.399 | 0.0089 | 0.0012 | 2.964 | −1.675 | 1.197 |
| Example 10 | −1.280 | −0.740 | 0.0138 | 0.0016 | 3.441 | −1.175 | 1.588 |
| Example 11 | −1.420 | −0.865 | 0.0227 | 0.0025 | 3.626 | −0.857 | 0.991 |
| Example 12 | −2.042 | −1.005 | 0.0149 | 0.0020 | 2.972 | −1.285 | 1.279 |
| Example 13 | −1.180 | −0.607 | 0.0091 | 0.0012 | 3.049 | −0.752 | 1.239 |
| Reference Example | −0.992 | −0.590 | 0.0281 | 0.0030 | 3.747 | −0.551 | 0.934 |
| Example 14 | −1.241 | −0.742 | 0.0085 | 0.0011 | 3.100 | −0.752 | 1.013 |
| Example 15 | −1.391 | −0.860 | 0.0102 | 0.0013 | 3.139 | −0.871 | 1.013 |
| Example 16 (wide-angle end) | −1.956 | −0.962 | 0.0093 | 0.0012 | 3.084 | −1.297 | 1.348 |

From the above-described embodiment and examples thereof, the following aspects of the invention is derived.

An aspect of the present invention is an image-acquisition apparatus including an objective lens that forms an optical image of an object, an image-acquisition device that converts the optical image formed by the objective lens into an electrical signal, and first and second holding frames holding the objective lens and the image-acquisition device inside. The objective lens consists of, in order from an object side, a first group and a second group. The first holding frame holds the first group. The second holding frame holds the image-acquisition device and the second group. The objective lens satisfies conditions (1) and (2):

$$-2.871 < f\_front/f < -1.180 \quad (1)$$

$$-1.498 < f\_front/f\_rear < -0.607 \quad (2)$$

where f_front is a focal length of the first group, f_rear is a focal length of the second group, and f is a focal length of the entire objective lens.

According to this aspect, a first unit is composed of some lenses on the object side of the objective lens and the first holding frame, whereas a second unit is composed of the remaining lenses on the image side of the objective lens, the image-acquisition device, and the second holding frame. During manufacture, the first unit can be moved along the optical axis relative to the second unit to adjust the distance between the first group and the image-acquisition device, thereby focusing the objective lens on the image-acquisition device.

In this case, when only the first group, which is located on the object side, of the lenses forming the objective lens is moved along the optical axis, the amount of movement of the image plane is smaller than the amount of movement of the first group; therefore, the first group requires a lower positioning accuracy. Even if the position of the first group deviates from the design value, the deviation of the position of the image plane from the image-acquisition plane of the image-acquisition device falls within the tolerance limit. This allows the manufacture of an image-acquisition apparatus including an image-acquisition device with a fine pixel pitch while stably achieving the desired depth of field without requiring high assembly accuracy.

In the above aspect, the objective lens and the image-acquisition device may satisfy condition (3):

$$2.5 \times P \times Fno < 0.03 \quad (3)$$

where P is a pixel pitch (mm) of the image-acquisition device, and Fno is an effective f-number of the objective lens.

According to this aspect, a design requiring a high focusing accuracy sufficient to satisfy condition (3) above can be implemented.

In the above aspect, the position of each lens forming the second group may be fixed relative to the image-acquisition device.

The movement of the lenses belonging to the second group, which is located on the image side, greatly affects the focal position; therefore, it is preferred to fix the position of each lens of the second group relative to the image-acquisition device. It is also preferred to use a movable lens in the first group if a focus function implemented by lens movement should be provided for the objective lens.

In the above aspect, the second group may include at least one cemented lens.

A preferred objective lens is a retrofocus lens, which achieves a wider angle and a smaller size. Retrofocus lenses, however, cause chromatic aberration of magnification due to the negative power of a concave lens located closest to the object side. The cemented lens in the second group G2, which is located close to the image plane, can effectively correct for the chromatic aberration of magnification.

In the above aspect, the first holding frame may include a plurality of holding frames, each holding at least one lens.

This improves the design flexibility of the frame.

In the above aspect, one of the plurality of holding frames may be movable along an optical axis.

This allows one of the lenses that form the first group to be movable along the optical axis to provide a focus function for the objective lens without affecting the focusing accuracy.

REFERENCE SIGNS LIST 1 image-acquisition apparatus
2 objective lens
3 image-acquisition device
3a image-acquisition plane
4, 5 holding frame
G1 first group
G2 second group
U1 first unit
U2 second unit
IMG image plane
S aperture stop

The invention claimed is:

1. An image-acquisition apparatus comprising:
an objective lens that forms an optical image of an object;
an image-acquisition device that converts the optical image formed by the objective lens into an electrical signal; and
first and second holding frames holding the objective lens and the image-acquisition device inside, the first and the second holding frames being bonded to each other in a state in which an image plane of the objective lens coincides with an image-acquisition plane of the image-acquisition device,
wherein the objective lens consists of, in order from an object side, a first group and a second group,
the first holding frame holds the first group,
the second holding frame holds the image-acquisition device and the second group, and
the objective lens satisfies conditions (1) and (2):

$$-2.871 < f\_front/f < -1.180 \quad (1)$$

$$-1.498 < f\_front/f\_rear < -0.607 \quad (2)$$

wherein
f_front is a focal length of the first group,
f_rear is a focal length of the second group,
f is a focal length of the entire objective lens, and
the second holding frame consists of a single member.

2. The image-acquisition apparatus according to claim 1, wherein the objective lens and the image-acquisition device satisfy condition (3):

$$2.5 \times P \times Fno < 0.03 \text{ [mm]} \quad (3)$$

wherein
P is a pixel pitch (mm) of the image-acquisition device, and
Fno is an effective f-number of the objective lens.

3. The image-acquisition apparatus according to claim 2, wherein the position of each lens forming the second group is fixed relative to the image-acquisition device.

4. The image-acquisition apparatus according to claim 3, wherein the second group comprises at least one cemented lens.

5. An image-acquisition apparatus comprising:
an objective lens that forms an optical image of an object;
an image-acquisition device that converts the optical image formed by the objective lens into an electrical signal; and
first and second holding frames holding the objective lens and the image-acquisition device inside, the first and the second frames being bonded to each other in a state in which an image plane of the objective lens coincides with an image-acquisition plane of the image-acquisition device,
wherein the objective lens consists of, in order from an object side, a first group and a second group,
the first holding frame holds the first group,
the second holding frame holds the image-acquisition device and the second group, and
the objective lens satisfies conditions (1') and (2):

$$-2.871 < f\_front/f < -1.180 \qquad (1)'$$

$$-1.498 < f\_front/f\_rear < -0.607 \qquad (2)$$

wherein
f_front is a focal length of the first group,
f_rear is a focal length of the second group,
f is a focal length of the entire objective lens, and
the second holding frame consists of a single member.

* * * * *